United States Patent
Ichino et al.

(12)

(10) Patent No.: US 9,837,819 B2
(45) Date of Patent: Dec. 5, 2017

(54) POWER NETWORK SYSTEM, POWER CONTROL METHOD, POWER ROUTER, CONTROL APPARATUS, AND STORAGE MEDIUM

(71) Applicant: NEC Corporation, Tokyo (JP)

(72) Inventors: Kiyohisa Ichino, Tokyo (JP); Noriaki Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 269 days.

(21) Appl. No.: 14/716,203

(22) Filed: May 19, 2015

(65) Prior Publication Data
US 2015/0349524 A1    Dec. 3, 2015

(30) Foreign Application Priority Data

May 27, 2014   (JP) .................................. 2014-109097

(51) Int. Cl.
| | |
|---|---|
| *H02J 1/00* | (2006.01) |
| *H02J 3/00* | (2006.01) |
| *H02J 3/48* | (2006.01) |
| *H02J 4/00* | (2006.01) |
| *H02J 9/02* | (2006.01) |

(52) U.S. Cl.
CPC ................ *H02J 3/005* (2013.01); *H02J 3/48* (2013.01); *H02J 4/00* (2013.01); *H02J 9/02* (2013.01); *Y10T 307/352* (2015.04)

(58) Field of Classification Search
None
See application file for complete search history.

(56) References Cited

U.S. PATENT DOCUMENTS

| | | | |
|---|---|---|---|
| 2013/0274947 A1* | 10/2013 | Miller ..................... | G06F 1/263 700/297 |
| 2014/0204955 A1* | 7/2014 | Kelly ...................... | H04L 49/30 370/401 |

FOREIGN PATENT DOCUMENTS

| | | |
|---|---|---|
| JP | P4783453 B9 | 7/2011 |
| WO | WO-2014/020951 | 2/2014 |

OTHER PUBLICATIONS

The Digital Grid Consortium "What is the Digital Grid?", downloaded Jul. 28, 2015, 17 pages, http://www.digitalgrid.org/en/technology/.

* cited by examiner

*Primary Examiner* — Jared Fureman
*Assistant Examiner* — Aqeel Bukhari
(74) *Attorney, Agent, or Firm* — Wilmer Cutler Pickering Hale and Dorr LLP

(57) ABSTRACT

Disclosed is a power network system etc. which can safely detach a power router whose communication with a control apparatus becomes interrupted, from other power routers and power cells, the power network system including a second control apparatus controlling one of or plural of the power cells, when the second control apparatus detects abnormality in communication between the apparatus itself and the power router, the second control apparatus performs control so as to stop transmission/reception between the power router in which the abnormality is detected and another power router which is connected to the power router, and when the first control apparatus included in the power router detects abnormality in communication between the power router and the second control apparatus, the first control apparatus performs control so as to stop transmission/reception of the power conversion leg connected to the another power router.

10 Claims, 30 Drawing Sheets

Fig. 15

| FIRST POWER ROUTER \ SECOND POWER ROUTER | MASTER LEG | DESIGNATED-POWER TRANSMISSION/ RECEPTION LEG | STAND-ALONE LEG | AC THROUGH |
|---|---|---|---|---|
| MASTER LEG | UNCONNECTABLE | UNCONNECTABLE | CONNECTABLE | CONNECTABLE |
| DESIGNATED-POWER TRANSMISSION/ RECEPTION LEG | UNCONNECTABLE | UNCONNECTABLE | CONNECTABLE | CONNECTABLE |
| STAND-ALONE LEG | CONNECTABLE | CONNECTABLE | UNCONNECTABLE | CONNECTABLE |
| AC THROUGH | CONNECTABLE | CONNECTABLE | CONNECTABLE | NO MEANING EVEN WHEN CONNECTED |

Fig. 25

| IDENTIFIER OF POWER ROUTER | No. OF LEG | OTHER SIDE OF THE CONNECTION | IDENTIFIER OF POWER ROUTER AS THE OTHER SIDE OF THE CONNECTION | No. OF LEG IN THE OTHER SIDE OF THE CONNECTION |
|---|---|---|---|---|
| POWER ROUTER 801 | 1 | UTILITY GRID | / | / |
| POWER ROUTER 801 | 2 | POWER ROUTER | POWER ROUTER 802 | 3 |
| POWER ROUTER 801 | 3 | LOAD | / | / |
| POWER ROUTER 801 | 4 | POWER ROUTER | POWER ROUTER 804 | 2 |
| POWER ROUTER 802 | 1 | LOAD | / | / |
| POWER ROUTER 802 | 2 | POWER ROUTER | POWER ROUTER 803 | 1 |
| POWER ROUTER 802 | 3 | POWER ROUTER | POWER ROUTER 801 | 2 |
| POWER ROUTER 803 | 1 | POWER ROUTER | POWER ROUTER 802 | 2 |
| POWER ROUTER 803 | 2 | UTILITY GRID | / | / |
| POWER ROUTER 803 | 3 | POWER ROUTER | POWER ROUTER 804 | 3 |
| POWER ROUTER 804 | 1 | DISTRIBUTED POWER SUPPLY | / | / |
| POWER ROUTER 804 | 2 | POWER ROUTER | POWER ROUTER 801 | 4 |
| POWER ROUTER 804 | 3 | POWER ROUTER | POWER ROUTER 803 | 3 |
| POWER ROUTER 804 | 4 | LOAD | / | / |

Fig. 26

| IDENTIFIER OF POWER ROUTER | No. OF LEG | OTHER SIDE OF THE CONNECTION | IDENTIFIER OF POWER ROUTER AS THE OTHER SIDE OF THE CONNECTION | No. OF LEG IN THE OTHER SIDE OF THE CONNECTION |
|---|---|---|---|---|
| POWER ROUTER 801 | 1 | UTILITY GRID | | |
| POWER ROUTER 801 | 2 | POWER ROUTER | POWER ROUTER 802 | 3 |
| POWER ROUTER 801 | 3 | LOAD | | |
| POWER ROUTER 801 | 4 | POWER ROUTER | POWER ROUTER 804 | 2 |
| POWER ROUTER 802 | 1 | LOAD | | |
| POWER ROUTER 802 | 2 | POWER ROUTER | POWER ROUTER 803 | 1 |
| POWER ROUTER 802 | 3 | POWER ROUTER | POWER ROUTER 801 | 2 |
| POWER ROUTER 803 | 1 | POWER ROUTER | POWER ROUTER 802 | 2 |
| POWER ROUTER 803 | 2 | UTILITY GRID | | |
| POWER ROUTER 803 | 3 | POWER ROUTER | POWER ROUTER 804 | 3 |
| POWER ROUTER 804 | 1 | DISTRIBUTED POWER SUPPLY | | |
| POWER ROUTER 804 | 2 | POWER ROUTER | POWER ROUTER 801 | 4 |
| POWER ROUTER 804 | 3 | POWER ROUTER | POWER ROUTER 803 | 3 |
| POWER ROUTER 804 | 4 | LOAD | | |

Fig. 27

| No. OF LEG | OTHER SIDE OF THE CONNECTION |
|---|---|
| 1 | UTILITY GRID |
| 2 | POWER ROUTER |
| 3 | LOAD |
| 4 | POWER ROUTER |

POWER NETWORK SYSTEM, POWER CONTROL METHOD, POWER ROUTER, CONTROL APPARATUS, AND STORAGE MEDIUM

This application is based upon and claims the benefit of priority from Japanese Patent Application No. 2014-109097, filed on May 27, 2014, the disclosure of which is incorporated herein in its entirety by reference.

TECHNICAL FIELD

The present invention relates to a power network system, a power control method, a power router, a control apparatus, and a storage medium and, more particularly, relates to a technique of managing a plurality of power cells.

BACKGROUND ART

For building a power supply system, it is a significant challenge to expand a power transmission network more stably and, moreover, configure a system capable of introducing a large amount of natural energy. As a novel power network, a power network system called a digital grid (registered trademark) is proposed as disclosed in Japanese Patent Publication No. 4,783,453 and http://www.digitalgrid.org/ (digital grid consortium). A digital grid is a power network system in which a power network is divided into small-scale cells and the cells are asynchronously connected to one another. A divided power cell which is small has a scale including one house, building, or commercial facility. A divided power cell which is large has a scale including a prefecture, a city, a town, and a village. A power cell includes a load and, in some cases, a power-generating facility and a power storing facility. An example of the power-generating facility is a power-generating facility using natural energy such as solar power generation, wind power generation, and geothermal power generation.

To allow free generation of power in each of the power cells and smooth interchange of power among the power cells, the power cells are connected asynchronously. In other words, even when a plurality of power cells are connected to one another, the voltage, phase, frequency of power used in each power cell are not synchronized with those of another power cell. FIG. 28 is a diagram illustrating an example of a power network system 10. In FIG. 28, a utility grid 11 transmits base power from a large-scale power plant 12. A plurality of power cells 21 to 24 is set. Each of the power cells 21 to 24 has loads such as a house 31 and a building 32, power generating facilities 33 and 34, and a power storing facility 35. Examples of the power generating facilities are a solar power panel 33 and a wind power generator 34. The power storing facility is a storage battery 35 or the like. In the specification, the power generating facilities and power storing facilities will be also collectively called a "distributed power supply".

Further, the power cells 21 to 24 have power routers 41 to 44, respectively, as connection ports to be connected to the other power cells or the utility grid 11. Each of the power routers 41 to 44 has a plurality of legs (LEG). In FIG. 28, the reference characters of the legs are not depicted and blank circles attached to the power routers 41 to 44 indicate connection terminals of the legs. The leg has a connection terminal and a power converter, and an address is assigned to each of the legs. A power conversion by a leg includes a conversion from alternating current to direct current or from direct current to alternating current, and a change of voltage, frequency, or phase of power.

The power routers 41 to 44 are connected to a management server 50 via a communication network 51 and are controlled integrally by the management server 50. For example, the management server 50 instructs the power routers 41 to 44 to transmit or receive power by the legs using the addresses assigned to the legs. By the operation, power interchange is performed among the power cells via the power routers 41 to 44.

By realizing power interchange among the power cells, for example, one power generating facility 33 or 34 and one power storing facility 35 can be commonly used by a plurality of power cells. When surplus power is interchanged among the power cells, while largely reducing the cost of the facilities, the power demand and supply balance can be stably maintained.

As described above, the management server 50 and the power routers 41 to 44 under the management server 50 communicate with each other via the communication network 51. In the case where the communication becomes interrupted due to a failure or the like, the management server 50 cannot control/monitor one or some of the power routers 41 to 44. When a power router is left without being controlled or monitored, a serious accident may be brought about. Therefore, it is desirable to safely detach the power router which became unable to communicate from the other power routers and power cells. The safe detachment is achieved by stopping the legs connected to the other power routers and other power cells, for the legs in the power routers which became unable to communicate.

However, the management server 50 cannot stop the legs in the power router which became unable to communicate directly via the communication network 51 for a reason that the communication to the power router is interrupted. There is also a method that a power router which became unable to communicate stops its legs by self-determination but the method should not be employed. The reason is that there may be other power routers and power cells depending on power transmitted from the power router which became unable to communicate. When the legs are stopped without considering the dependency relation, chain blackout may be caused.

SUMMARY

The present invention has been achieved to solve such problems and a major object of the invention is to provide a power network system, a power router, a control apparatus, and a storage medium storing control program capable of safely detaching a power router whose communication with a control apparatus (management server) becomes interrupted, from other power routers and power cells.

A power network system according to a first aspect of the present invention includes a power cell including a power router asynchronously connected to a power system on the outside, the power router includes:

a Direct Current (DC) bus which is maintained at a predetermined rated voltage;

a plurality of power conversion legs each of which one connection end is connected to the DC bus and the other connection end is connected as an outside connection terminal to any of an other side of the connection including another power router, a power system, a distributed power supply, and a load, and converting power between the one connection end and the other connection end; and a first control apparatus controlling the plurality of power conversion legs, wherein the power network system further comprises a second control apparatus controlling one of or plural of the power cells, when the second control apparatus detects abnormality in communication between the apparatus itself and the power router, the second control apparatus performs control so as to stop transmission/reception between the power router in which the abnormality is detected and another power router which is connected to the power router, and when the first control apparatus included in the power router detects abnormality in communication between the power router and the second control apparatus, the first control apparatus performs control so as to stop transmission/reception of the power conversion leg connected to the another power router.

A power control method in a power network system according to a first aspect of the present invention includes a power cell including a power router asynchronously connected to a power system on the outside, the power router includes:

a DC bus which is maintained at a predetermined rated voltage;

a plurality of power conversion legs each of which one connection end is connected to the DC bus and the other connection end is connected as an outside connection terminal to any of the other side of the connection including another power router, a power system, a distributed power supply, and a load, and converting power between the one connection end and the other connection end; and a first control apparatus controlling the plurality of power conversion legs, wherein the power network system further comprises a second control apparatus controlling one of or plural of the power cells, when the second control apparatus detects abnormality in communication between the apparatus itself and the power router, the second control apparatus performs control so as to stop transmission/reception between the power router in which the abnormality is detected and another power router which is connected to the power router, and when the first control apparatus included in the power router detects abnormality in communication between the power router and the second control apparatus, the first control apparatus performs control so as to stop transmission/reception of the power conversion leg connected to the another power router.

A power router according to a first aspect of the present invention for asynchronously connecting a power cell to a power system on the outside, includes:

a DC bus which is maintained at a predetermined rated voltage;

a plurality of power conversion legs each of which one connection end is connected to the DC bus and the other connection end is connected as an outside connection terminal to any of the other side of the connection including another power router, a power system, a distributed power supply, and a load, and converting power between the one connection end and the other connection end; and a first control apparatus controlling the plurality of power conversion legs, wherein when abnormality in communication with a second control apparatus controlling one of or plural of power cells is detected, the power router performs control so as to stop transmission/reception of the power conversion leg which is connected to the another power router.

A control apparatus according to a first aspect of the present invention controlling one of or plural of power cells each having a power router comprising: a DC bus which is maintained at a predetermined rated voltage; a plurality of power conversion legs each of which one connection end is connected to the DC bus and the other connection end is connected as an outside connection terminal to any of the other side of the connection including another power router, a power system, a distributed power supply, and a load, and converting power between the one connection end and the other connection end; and a first control apparatus controlling the plurality of power conversion legs, wherein when the control apparatus detects abnormality in communication between the apparatus itself and the power router, the control apparatus performs control so as to stop transmission/reception between the power router in which the abnormality is detected and another power router which is connected to the power router.

The object is also achieved by a computer program realizing the control apparatus or the power router each having the above-described configuration by a computer and a computer-readable recording medium storing the computer program.

The present invention produces an effect that a power router whose communication with a control apparatus (management server) becomes interrupted can be safely detached from other power routers and power cells.

BRIEF DESCRIPTION OF THE DRAWINGS

Exemplary features and advantages of the present invention will become apparent from the following detailed description when taken with the accompanying drawings in which:

FIG. 15 is a table of patterns of combination in connection of power routers;

FIG. 25 is a diagram illustrating an example of a topology information table according to the first exemplary embodiment of the invention;

FIG. 26 is a diagram illustrating an example in which record is eliminated in the topology information table according to the first exemplary embodiment of the invention;

FIG. 27 is a diagram illustrating an example of a table of other sides of connection according to the first exemplary embodiment of the invention;

EXEMPLARY EMBODIMENTS

Figure 1:
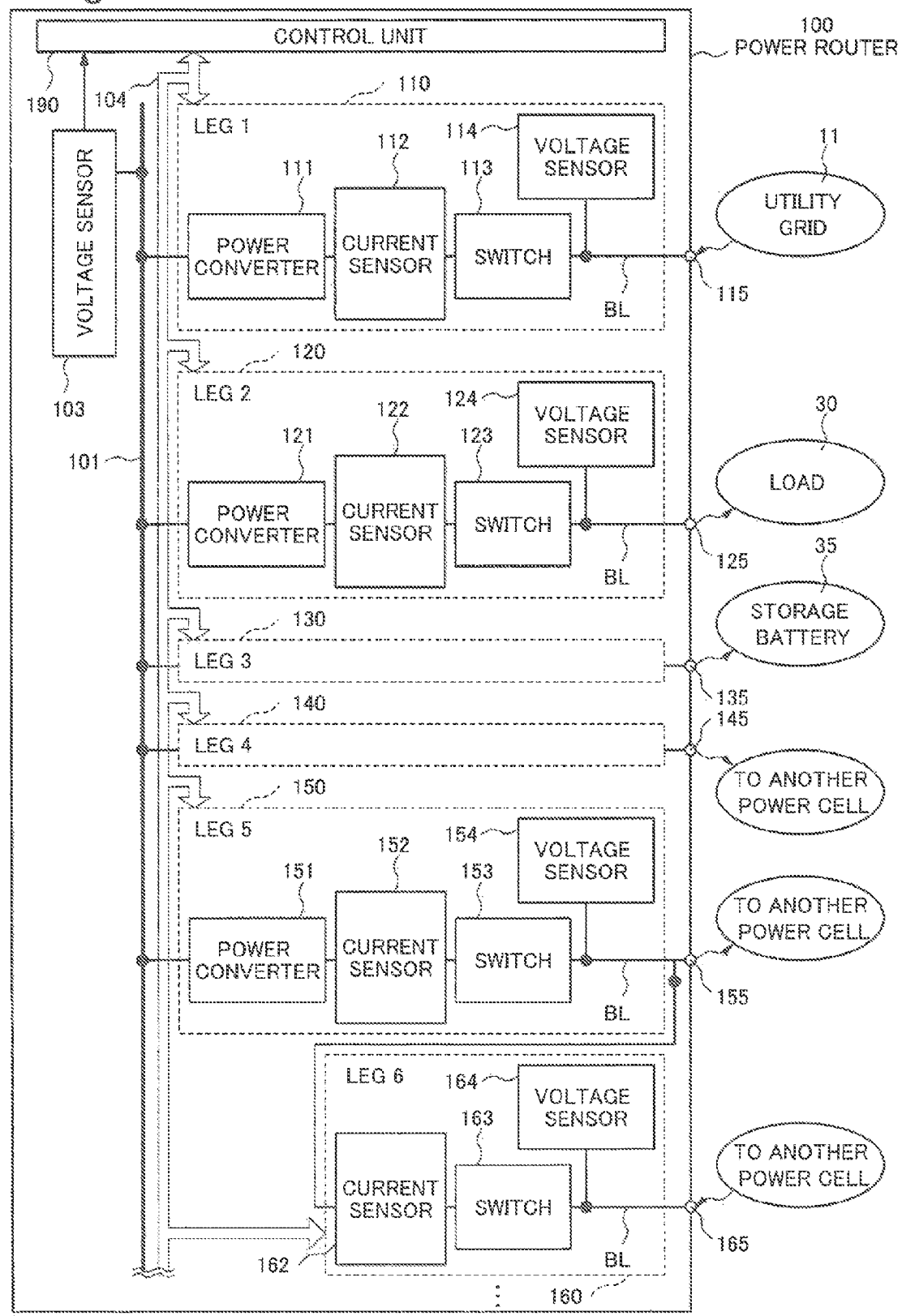
FIG. 1 is a block diagram illustrating a schematic configuration of a power router according to a first exemplary embodiment of the present invention.

Hereinbelow, exemplary embodiments of the present invention will be described in detail with reference to the drawings.

First Exemplary Embodiment

In the following, concrete exemplary embodiments to which the present invention is applied will be described in detail with reference to the drawings. In the drawings, the same reference numerals are designated to the same elements. For clear description, repetitive description will not be given as necessary. An "other side of the connection" in the following refers to an element to which a leg is connected.

Figure 2:
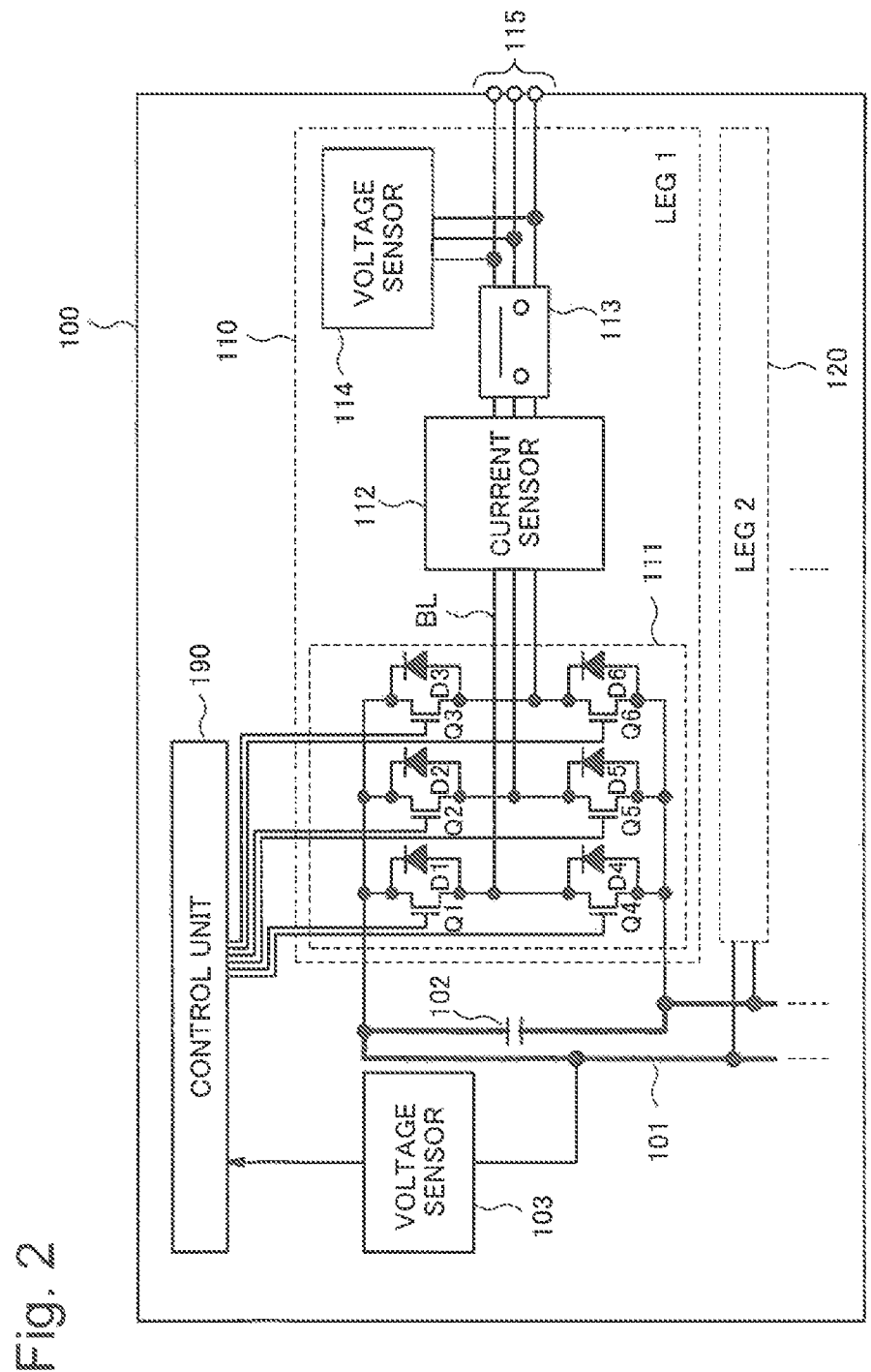
FIG. 2 is a block diagram illustrating the internal configuration of the power router according to the first exemplary embodiment of the invention.

First, the configuration of a power router according to the first exemplary embodiment of the present invention will be described. FIG. 1 is a diagram illustrating a schematic configuration of a power router 100 according to a first exemplary embodiment of the present invention. FIG. 2 is a diagram illustrating the internal configuration of the power router 100 more specifically. The power router 100 has, roughly, a DC (Direct Current) bus 101, a plurality of legs 110, 120, 130, 140, 150, and 160, and a control unit 190.

To the DC bus 101, the plurality of legs 110 to 160 are connected in parallel. The DC bus 101 is a line passing DC power and is controlled to maintain a predetermined voltage. How the voltage of the DC bus 101 is maintained constant will be described later.

The power router 100 is connected to components on the outside via the legs 110 to 160. At this time, the power router 100 converts all of power to be outputted/inputted to/from the outside to direct current once and transmits the current to the DC bus 101. By converting the voltage once to direct current as described above, the differences in frequency, voltage, and phase become unrelated, so that the power cells can be connected asynchronously. As illustrated in FIG. 2, it is assumed that the DC bus 101 is of a parallel type having a smoothing capacitor 102. A voltage sensor 103 is connected to the DC bus 101 and a voltage value of the DC bus 101 detected by the voltage sensor 103 is sent to the control unit 190. The control unit 190 controls the operation states (such as an operation of transmitting power to the outside and an operation of receiving power from the outside) of the legs 110 to 160 via a communication bus 104, thereby maintaining the voltage of the DC bus 101 to a predetermined value.

Next, the legs 110 to 160 will be described. The plurality of legs 110 to 160 are provided in parallel to the DC bus. In FIG. 1, six legs 110 to 160 are illustrated. As illustrated in FIG. 1, the six legs 110 to 160 are set as the first leg 110, the second leg 120, . . . and the sixth leg 160. In FIG. 1, the first leg 110 is indicated as leg 1, and the second leg 120 is indicated as leg 2. In FIG. 2, the third leg 130, the fourth leg 140, and the sixth leg 160 are not illustrated.

Although the first to fifth legs 110 to 150 have the same configuration, the sixth leg 160 is different from the first to fifth legs 110 to 150 with respect to the point that it does not have a power converter. First, the configuration of the first to fifth legs 110 to 150 will be described. Since the first to fifth legs 110 to 150 have the same configuration, the configuration of the first leg 110 will be described as a representative. The first leg 110 has a power converter 111, a current sensor 112, a switch 113, a voltage sensor 114, and a connection terminal 115. The power converter 111 converts AC power to DC power or converts DC power to AC power. Since the DC power flows in the DC bus 101, the power converter 111 converts the DC power flowing in the DC bus 101 to AC power of predetermined frequency and voltage and passes the AC power to the outside from the connection terminal 115. Alternatively, the power converter 111 converts the AC power flowing in from the connection terminal 115 to DC power and passes the DC power to the DC bus 101.

The power converter 111 has the configuration of an inverter circuit. Concretely, as illustrated in FIG. 2, the power converter 111 has transistors Q1 to Q6 and diodes D1 to D6. One end of each of the transistors Q1 to Q3 is connected to a high-potential-side power supply line. The other ends of the transistors Q1 to Q3 are connected to one ends of the transistors Q4 to Q6, respectively. The other ends of the transistors Q4 to Q6 are connected to a low-potential-side power supply line. To the high-potential-side terminals of the transistors Q1 to Q6, the cathodes of the diodes D1 to D6 are connected, respectively. To the low-potential-side terminals of the transistors Q1 to Q6, the anodes of the diodes D1 to D6 are connected.

From the node between the transistors Q1 and Q4, the node between the transistors Q2 and Q5, and the node between the transistors Q3 and Q6, for example, by properly controlling the on/off timings of the transistors Q1 to Q6, phases of three-phase alternating current are outputted.

As described above, the power converter 111 has a configuration in which six antiparallel circuits constructed by a transistor and a diode are three-phase-bridge connected. A wire is led from the node between the transistors Q1 and Q4, a wire is led from the node between the transistors Q2 and Q5, and a wire is led from the node between the transistors Q3 and Q6, and the wires connecting the nodes and connection terminals are called branch lines BL. Since three-phase AC is used, one leg has three branch lines BL.

Since three-phase AC is used, a three-phase inverter circuit is employed. In some cases, a single-phase inverter circuit may be used. As the transistors Q1 to Q6, various active power conversion elements such as MOSFET (Metal-Oxide-Semiconductor Field-Effect Transistors) or IGBT (Insulated Gate Bipolar Transistors) can be used.

The direction of power, the frequency of AC power, and the like are controlled by the control unit 190. In other words, switching of the transistors Q1 to Q6 is controlled by the control unit 190. The operation control by the control unit 190 will be described later.

The switch 113 is disposed between the power converter 111 and the connection terminal 115. By switching of the switch 113, the branch lines BL are switched, in other words, the outside and the DC bus 101 are interrupted or connected. The voltage of the branch line BL is detected by the voltage sensor 114, and the current value of current flowing in the branch line BL is detected by the current sensor 112. The switching operation of the switch 113 is controlled by the control unit 190, and the detection values of the voltage sensor 114 and the current sensor 112 are outputted to the control unit 190.

In the above description, it is assumed that the power converter has the configuration of an inverter circuit, and the other side of the connection of a leg uses alternating current. However, there is also a case that the other side of the connection of a leg uses direct current (like the storage battery 35). For example, the third leg 130 in FIG. 1 is connected to the storage battery 35. The power conversion in this case is DC-DC conversion. Therefore, it is also possible to provide an inverter circuit and a converter circuit in parallel to the power converter and properly use the inverter circuit and the converter circuit in accordance with AC or DC being used by the other side of the connection. Alternatively, the power converter may be provided with a leg dedicated to DC-DC conversion as a DC-DC converter. From the viewpoint of size and cost, a power router having a leg dedicated to AC-DC conversion and a leg dedicated to DC-DC conversion is more advantageous than a power router in which an inverter circuit and a converter circuit are provided in parallel in each of all of the legs.

The configuration of the first to fifth legs 110 to 150 is as described above.

Next, the sixth leg 160 will be described. The sixth leg 160 does not have a power converter. In other words, a connection terminal 165 of the sixth leg 160 is not connected to the DC bus 101. The sixth leg 160 is connected to the branch line BL of the fifth leg 150. An internal line of the sixth leg 160 is also called a "branch line BL". The branch line BL of the sixth leg 160 is connected to the fifth leg 150 between a connection terminal 155 of the fifth leg 150 and a switch 153.

The sixth leg 160 has a switch 163, a voltage sensor 164, a current sensor 162, and the connection terminal 165. The branch line BL of the sixth leg 160 is connected to the branch line BL of the fifth leg 150 via the switch 163. In other words, the connection terminal 165 of the sixth leg 160 is connected to the connection terminal 155 of the fifth leg 150. Only the switch 163 is provided between the connection terminal 165 of the sixth leg 160 and the connection terminal 155 of the fifth leg 150, and the sixth leg 160 does not have a power converter. Therefore, power is conducted without being subjected to any conversion between the connection terminal 165 of the sixth leg 160 and the connection terminal 155 of the fifth leg 150. A leg having no power converter like the sixth leg 160 will be also called an "AC through leg".

The current sensor 162 and the voltage sensor 164 detect a current value and a voltage value of the branch line BL respectively and output the values to the control unit 190. The switching operation of the switch 163 is controlled by the control unit 190.

Operation Mode of Leg

The first, second, third, fourth, and fifth legs 110, 120, 130, 140, and 150 have the power converter 111, a power converter 121, a power converter 131, a power converter 141, and a power converter 151, respectively. As described above, the switching operation of the transistors Q1 to Q6 in the power converters is controlled by the control unit 190. The power router 100 is a node in the power network system 10 and has an important role of connecting the utility grid 11, the load 30, a distributed power supply, a power cell, and the like. The connection terminals 115 to 165 of the legs 110 to 160 are connected to the utility grid 11, the load 30, the distributed power supply such as the storage battery 35, and the power routers included in the other power cells. Since the roles of the legs 110 to 160 vary according to the other sides of connection, if the legs 110 to 160 do not perform proper operation according to the roles, the power routers do not work. In the exemplary embodiment, it will be described that the structures of legs are the same but the way of operating the legs is changed according to the other side of the connection.

The way of operating a leg will be called an "operation mode". In the exemplary embodiment, three kinds are prepared as operation modes of a leg, and the mode is switched according to the other side of the connection. As operation modes of a leg, there are a master mode, a stand-alone mode, and a designated power transmission/reception mode. Hereinbelow, the modes will be described in order.

Master Mode

The master mode is an operation mode in the case that a leg is connected to a stable power supply source such as a utility grid and an operation mode for maintaining the voltage of the DC bus 101. FIG. 1 illustrates an example that the connection terminal 115 of the first leg 110 is connected to the utility grid 11. In the case illustrated in FIG. 1, the first leg 110 is controlled so as to operate in the master mode and plays the role of maintaining the voltage of the DC bus 101. To the DC bus 101, the other many legs 120 to 150 are connected. There is a case that power flows from the legs 120 to 150 to the DC bus 101 and there is also a case that power flows from the DC bus 101 to the legs 120 to 150. In the case where the voltage of the DC bus 101 drops from rated voltage due to the outflow of power from the DC bus 101 to the legs 120 to 150, the leg 110 in the master mode makes up for the amount of power which becomes insufficient due to the outflow from the other side of the connection (in this case, the utility grid 11). On the other hand, in the case where the voltage of the DC bus 101 rises from the rated voltage due to inflow of power from the legs 120 to 150 to the DC bus 101, the amount of power which becomes excessive due to the inflow is passed to the other side of the connection (in this case, the utility grid 11). By such operation, the leg 110 in the master mode maintains the voltage of the DC bus 101.

Therefore, in one power router, at least one leg has to be operated in the master mode. Otherwise, the voltage of the DC bus 101 is not maintained constant. Although two or more legs may be operated in the master mode in one power router, the number of legs in the master mode in one power router may be one. A leg in the master mode may be connected to, other than a utility grid, for example, a distributed power supply (including a storage battery) having a self-commutated inverter. A distributed power supply having an externally commutated inverter and a leg in the master mode cannot be connected to each other.

In the following description, the leg operated in the master mode may be also called a "master leg".

Control of the master leg will be described. The master leg is controlled as follows on start-up. First, the control unit 190 sets the switch 113 to an open (broken) state. In this state, the connection terminal 115 is connected to the other side of the connection. In this case, the other side of the connection is the utility grid 11. The voltage sensor 114 measures the voltage of the grid as the connection destination, obtains the amplitude, frequency, and phase of the voltage of the grid by using a PLL (Phase-Locked-Loop) or the like, and outputs a detection value to the control unit 190. After that, the control unit 190 adjusts AC output of the power converter 111 so that the voltage of the obtained amplitude, frequency, and phase is outputted from the power converter 111. In other words, the control unit 190 determines the on/off pattern of the transistors Q1 to Q6. The control unit 190 monitors the output of the power converter 111. When the control unit 190 detects that the output became stable, by turning on the switch 113, the power converter 111 and the utility grid 11 are connected. At this time point, the output of the power converter 111 and the voltage of the utility grid 11 are synchronized, so that no current flows.

Next, control at the time of operating the master leg will be described. The voltage sensor 103 measures the voltage of the DC bus 101. When the voltage of the DC bus 101 exceeds a predetermined rated bus voltage, the control unit 109 controls the power converter 111 so that power transmission is performed from the master leg 110 toward the grid. In other words, the control unit 109 controls so that power transmission is performed from the DC bus 101 toward the utility grid 11 via the master leg 110 by adjusting at least one of the amplitude and phase of the voltage outputted from the power converter 111. The rated voltage of the DC bus 101 is preliminarily determined by a setting.

On the other hand, when the voltage of the DC bus 101 is lower than the predetermined rated bus voltage, the control unit 109 controls the power converter 111 so that the master leg 110 can receive power from the utility grid 11. In other words, by adjusting at least one of the amplitude and phase of the voltage outputted from the power converter 111, the control unit 109 controls so that power transmission is performed from the utility grid 11 to the DC bus 101 via the master leg 110. By performing such operation of the master leg, the voltage of the DC bus 101 can maintain the predetermined rating.

Stand-alone Mode

The stand-alone mode is an operation mode of generating a voltage having amplitude and frequency designated by the management server 50 and transmitting/receiving the power to/from the other side of the connection. For example, it is an operation mode of supplying power to the other side of the connection which consumes power such as the load 30 or an operation mode of receiving power transmitted from the other side of the connection as it is. FIG. 1 illustrates an example that a connection terminal 125 of the second leg 120 is connected to the load 30. In the example illustrated in FIG. 1, the second leg 120 is controlled so as to be operated in the stand-alone mode and supplies power to the load 30. When a leg is connected to another power router like the fourth and fifth legs 140 and 150, as a mode of transmitting an amount of power required by the other power router, there is a case that the fourth and fifth legs 140 and 150 are operated in the stand-alone mode. When a leg is connected to another power router like the fourth and fifth legs 140 and 150, as a mode of receiving power transmitted from the other power router, there is a case that the fourth and fifth legs 140 and 150 are operated in the stand-alone mode. Although not illustrated, also in the case where the second leg is connected to a power generating facility in place of the load 30, the second leg can be operated in the stand-alone mode. In this case, the power generating facility is provided with an externally commutated inverter. An operation mode in the case of connecting power routers will be described later.

A leg operated in the stand-alone mode will be called a "stand-alone leg". In one power router, there may be a plurality of stand-alone legs.

An operation control of a stand-alone leg will be described. First, the control unit 190 opens (breaks) a switch 123. In this state, the connection terminal 125 is connected to the load 30. The amplitude and frequency of power (voltage) to be supplied to the load 30 are instructed from the management server 50 to the power router 100. The control unit 190 controls so that the power (voltage) of the instructed amplitude and frequency is outputted from the power converter 121 toward the load 30. In other words, the control unit 190 determines the on/off pattern of the transistors Q1 to Q6. When the output becomes stable, by turning on the switch 123, the control unit 190 connects the power converter 121 and the load 30. After that, when the power is consumed by the load 30, the power of the consumed amount flows from the stand-alone leg 120 to the load 30.

Designated-Power Transmission/Reception Mode

A designated-power transmission/reception mode is an operation mode for transmitting/receiving power of an amount determined by designation. Specifically, there are a case of transmitting a designated power to the other side of the connection and a case of receiving a designated power from the other side of the connection. In FIG. 1, the fourth and fifth legs 140 and 150 are connected to other power routers. In such a case, the legs operated in the designated power transmission/reception mode accommodate the power of the determined amount from one leg to the other leg. The third leg 130 is connected to the storage battery 35. In such a case, the leg operating in the designated-power transmission/reception mode transmits power of the determined amount toward the storage battery 35 and charges the storage battery 35. Alternatively, a distributed power supply (including a storage battery) having a self-commutated inverter and a designated-power transmission/reception leg may be connected. However, a distributed power supply having an externally commutated inverter and a designated-power transmission/reception leg cannot be connected to each other.

A leg operated in the designated-power transmission/reception mode will be called a "designated-power transmission/reception leg". In one power router, a plurality of designated-power transmission/reception legs may exist.

Control of a designated-power transmission/reception leg will be described. Since the control at the time of startup is basically the same as that of the master leg, description of it will not be repeated.

Control at the time of operating a designated-power transmission/reception leg will be described. In the description, reference numerals designated to the fifth leg 150 in FIG. 1 will be used. A voltage sensor 154 measures a voltage of a cell of the other side of the connection and obtains the frequency and phase of the voltage of the other side of the connection by using PLL (Phase-Locked-Loop) or the like. On the basis of an active power value and a reactive power value designated by the management server 50 and the frequency and phase of the voltage of the other side of the connection, the control unit 190 obtains a target value of current which is inputted/outputted by the power converter 151. A current sensor 152 measures a present value of current. The control unit 190 adjusts the power converter 151 so that a current corresponding to the difference between the target value and the present value is additionally outputted. In other words, by adjusting at least one of the amplitude and phase of the voltage outputted from the power converter 151, the control unit 190 performs the control so that a desired power flows between the designated-power transmission/reception leg and the other side of the connection.

As described above, the first to fifth legs having the same configuration can play the roles of three patterns according to the way of the operation control.

Connection Restrictions

Since the operations of legs vary according to the operation modes, a restriction naturally occurs between selection of the other side of the connection and the selection of the operation mode. In other words, when the other side of the connection is determined, an operation mode which can be selected is determined. On the contrary, when an operation mode is determined, the other side of the connection which can be selected is determined. When the other side of the connection changes, it becomes necessary to change the operation mode of the leg accordingly. Hereinafter, patterns of possible connection combinations will be described.

Figure 3:
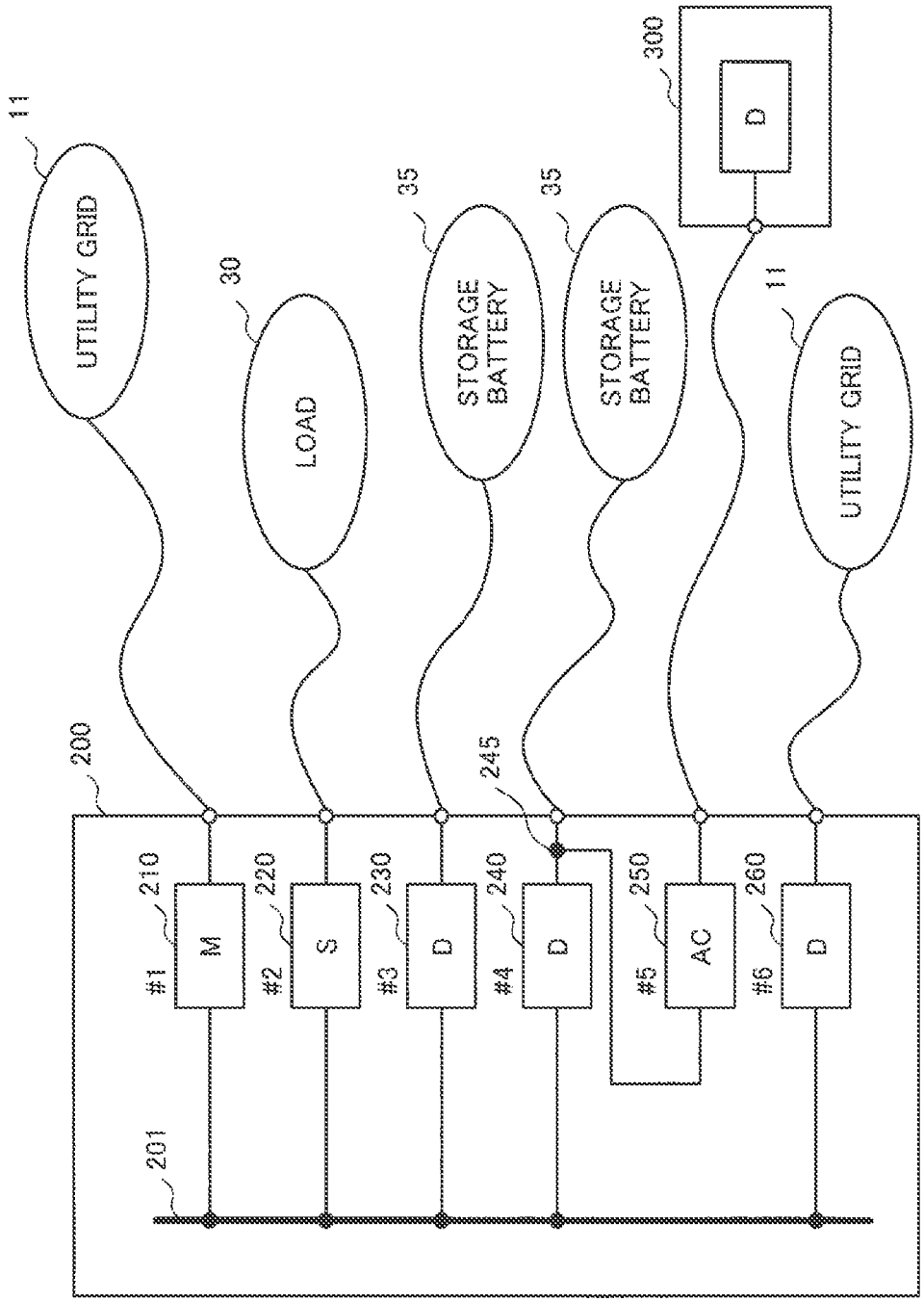
FIG. 3 is a diagram illustrating an example of connecting a power router to a utility grid, a load, and various dispersed power supplies.

In the following description, signage in the drawings will be simplified as illustrated in FIG. 3. The master leg is expressed by "M". The stand-alone leg is expressed by "S". The designated-power transmission/reception legs are expressed by "D". The AC through leg is expressed by "AC". By assigning numbers like "#1" at the shoulder of a leg as necessary, the legs may be distinguished. In FIG. 3 and subsequent drawings, systematic reference numerals are assigned. However, the same reference numerals are not always designated to the same elements among the drawings. For example, reference numeral 200 in FIG. 3 and reference numeral 200 in FIG. 4 do not refer to the same element.

Connection combinations illustrated in FIG. 3 are possible connections. A first leg 210 is connected as a master leg to the utility grid 11 as described above. A second leg 220 is connected as a stand-alone leg to the load 30 as also already described. A third leg 230 and a fourth leg 240 are connected as designated-power transmission/reception legs to the storage battery 35 as also already described.

A fifth leg 250 is an AC through leg. The AC through leg 250 is connected to a designated-power transmission/reception leg of another power router 300. The AC through leg 250 is also connected to the storage battery 35 via a connection terminal 245 of the fourth leg 240. Since the AC through leg 250 does not have a power converter, the connection relation is equivalent that the designated-power transmission/reception leg of another power router 300 is directly connected to the storage battery 35.

A sixth leg 260 is connected as a designated-power transmission/reception leg to the utility grid 11. When it is assumed that the power router 200 receives a determined power from the utility grid 11 via the sixth leg 260, such a connection is allowed. Since the first leg 210 is the master leg, if the power received by the sixth leg 260 is insufficient to maintain a rated voltage of the DC bus 201, the master leg 210 receives necessary power from the utility grid 11. On the contrary, when the power received by the sixth leg 260 exceeds an amount necessary to maintain the rated voltage of the DC bus 201, the master leg 210 passes an excessive power to the utility grid 11.

Next, the case of connecting power routers will be described. Connection of power routers means connection of a leg of one power router and a leg of another power router. In the case of connecting legs, there is a restriction in an operation mode for the combination.

Figure 4:
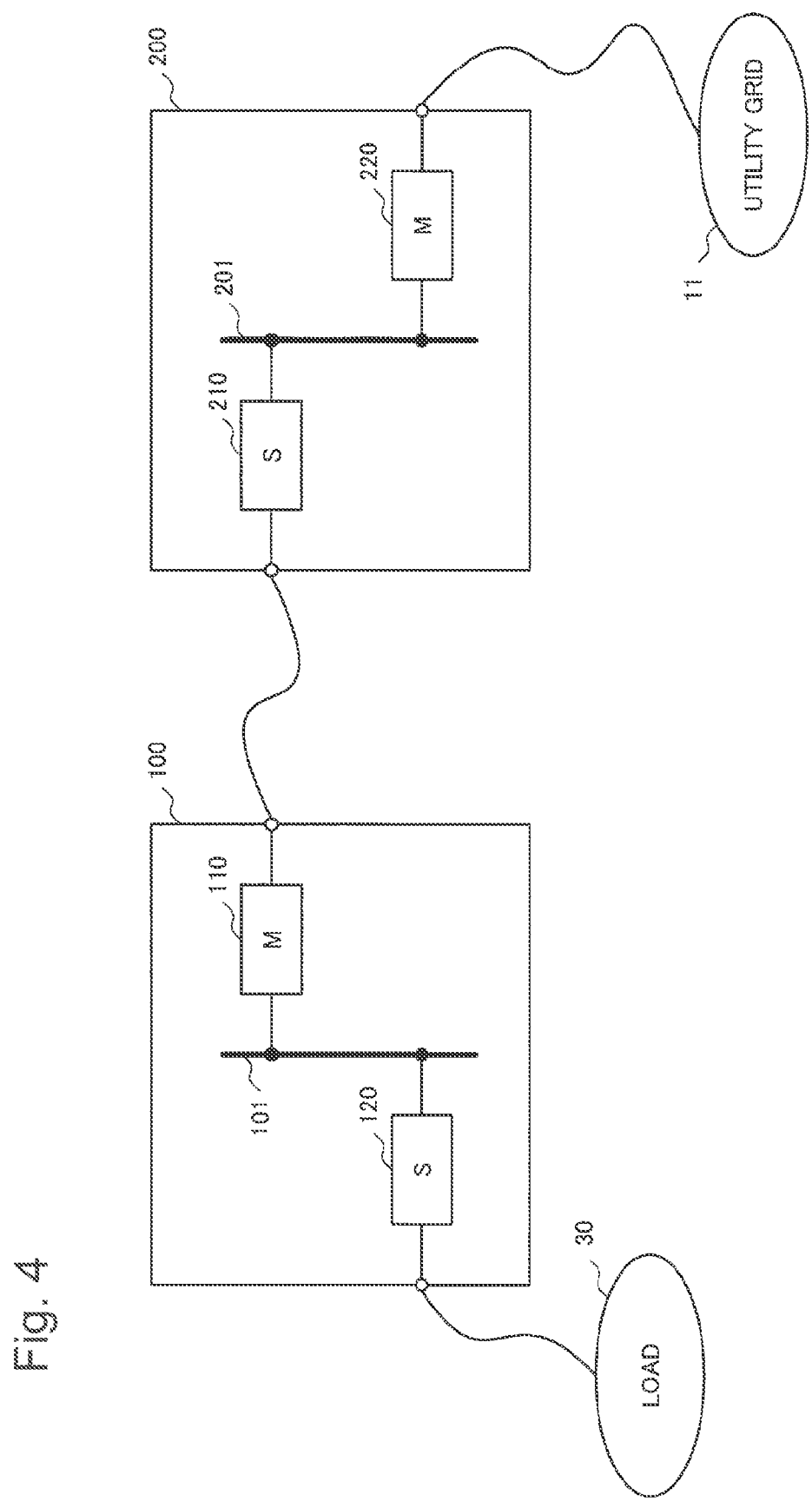
FIG. 4 is a diagram illustrating an example of a possible combination in connection of power routers.
Figure 5:
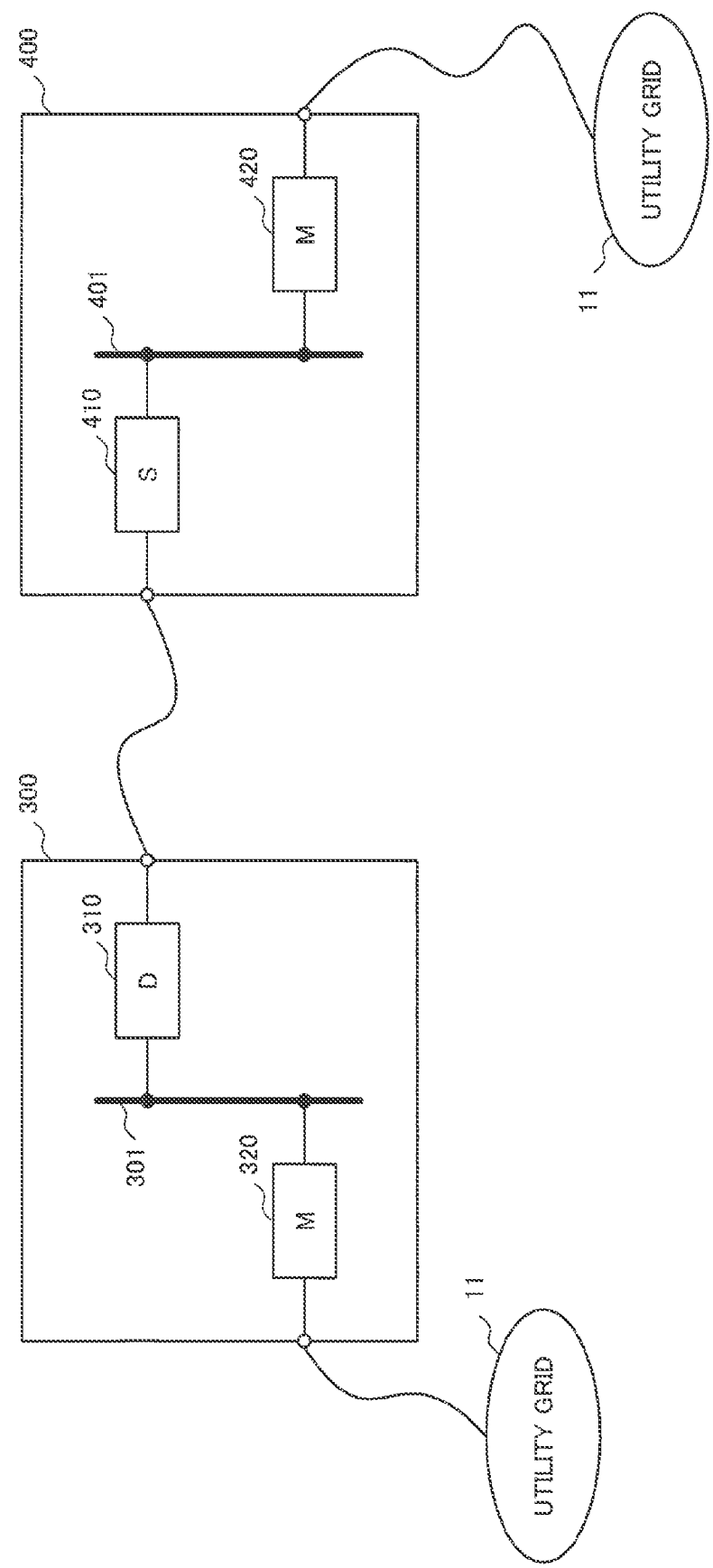
FIG. 5 is a diagram illustrating an example of a possible combination in connection of power routers.
Figure 6:
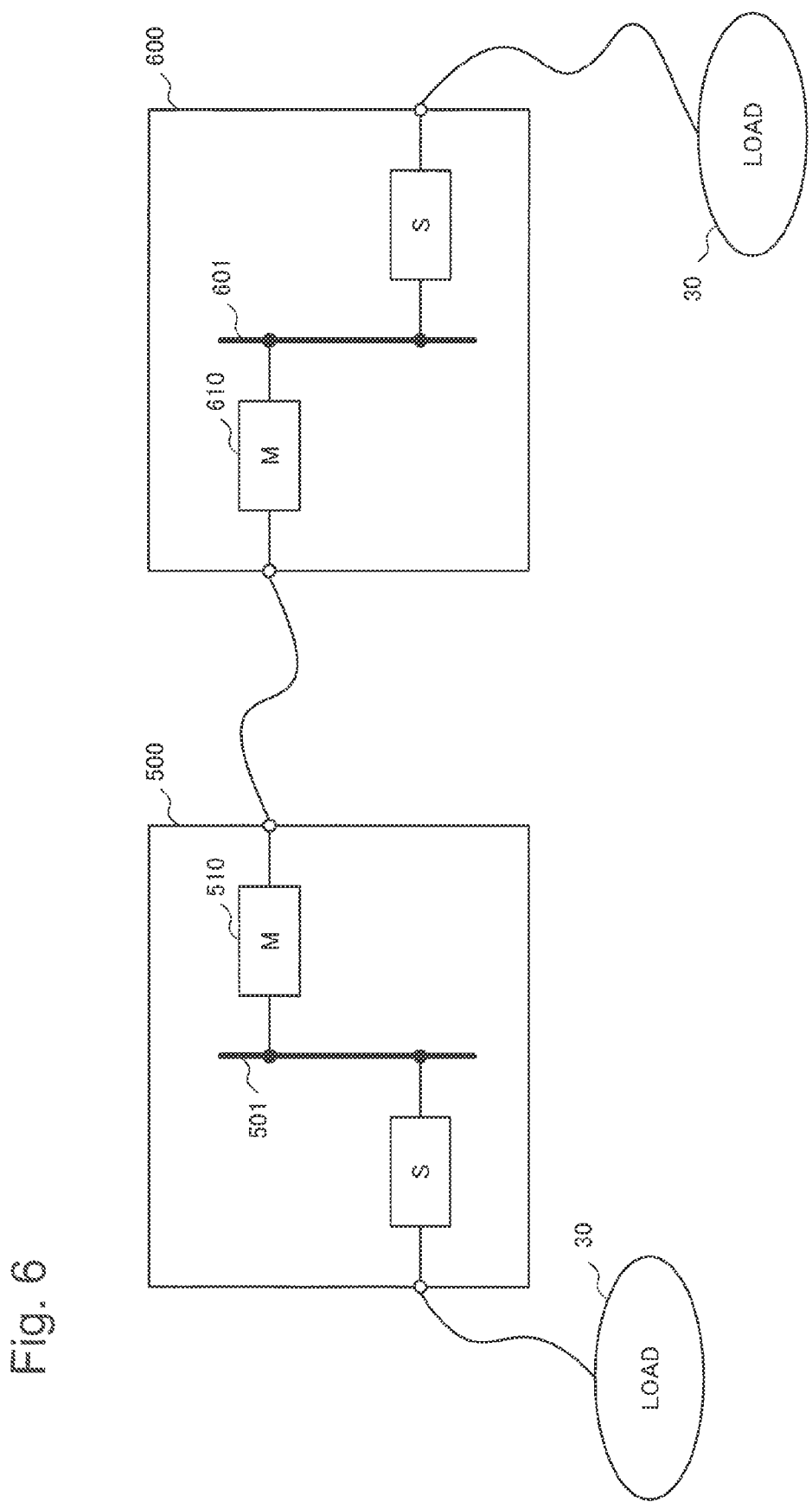
FIG. 6 is a diagram illustrating an example of an inhibited combination in connection of power routers.

Both of combinations of connection illustrated in FIGS. 4 and 5 are examples of possible combinations. In FIG. 4, the master leg 110 of the first power router 100 and the stand-alone leg 210 of the second power router 200 are connected. Although it will not be specifically described, the master leg 220 of the second power router 200 is connected to the utility grid 11, thereby maintaining the voltage of the DC bus 201 of the second power router 200 at the rated voltage.

In FIG. 4, when power is supplied from the first power router 100 to the load 30, the voltage of the DC bus 101 drops. The master leg 110 obtains power from the other side of the connection so as to maintain the voltage of the DC bus 101. In other words, the master leg 110 draws the power of the insufficient amount from the stand-alone leg 210 of the second power router 200. The stand-alone leg 210 of the second power router 200 transmits a power of the amount required from the other side of the connection (in this case, the master leg 110). In the DC bus 201 of the second power router 200, although the voltage drops only by the amount of transmission of the power from the stand-alone leg 210, it is compensated from the utility grid 11 by the master leg 220. In such a manner, the first power router 100 can obtain the power of a necessary amount from the second power router 200.

As described above, even when the master leg 110 of the first power router 100 and the stand-alone leg 210 of the second power router 200 are connected, since the role of the master leg 110 and that of the stand-alone leg 210 fit together, no inconvenience occurs in the operations. It is therefore understood that a master leg and a stand-alone leg may be connected as illustrated in FIG. 4.

In FIG. 5, a designated-power transmission/reception leg 310 of the third power router 300 and a stand-alone leg 410 of a fourth power router 400 are connected to each other. Although it will not be specifically described, a master leg 320 of the third power router 300 and a master leg 420 of the fourth power router 400 are connected to the utility grid 11, so that DC buses 301 and 401 of the third and fourth power routers 300 and 400 maintain the rated voltage.

It is assumed that, by an instruction from the management server 50, the designated-power transmission/reception leg 310 of the third power router 300 is instructed to receive a designated power. The designated-power transmission/reception leg 310 draws the designated power from the stand-alone leg 410 of the fourth power router 400. The stand-alone leg 410 of the fourth power router 400 transmits a power of an amount required by the other side of the connection (in this case, the designated-power transmission/reception leg 310). In the DC bus 401 of the fourth power router 400, the voltage drops only by the amount of power transmitted from the stand-alone leg 410, it is compensated from the utility grid 11 by the master leg 420.

As described above, even when the designated-power transmission/reception leg 310 of the third power router 300 and the stand-alone leg 410 of the fourth power router 400 are connected, since the role of the designated-power transmission/reception leg 310 and that of the stand-alone leg 410 fit together, no inconvenience occurs in the operations. It is therefore understood that a designated-power transmission/reception leg and a stand-alone leg may be connected as illustrated in FIG. 5.

Although the case where the third power router 300 receives power from the fourth power router 400 has been described, there is similarly no inconvenience also in the case where power is conversely given from the third power router 300 to the fourth power router 400.

In such a manner, a designated power can be given between the third and fourth power routers 300 and 400.

In the case of directly connecting legs having power converters, only two patterns illustrated in FIGS. 4 and 5 are allowed. In other words, only the pattern of connecting a master leg and a stand-alone leg and the pattern of connecting a designated-power transmission/reception leg and a stand-alone leg are allowed.

Next, combinations of legs which cannot be connected will be described. FIGS. 6 to 9 are drawings illustrating patterns of legs which cannot be connected to each other. As will be understood from FIGS. 6, 7, and 8, legs in the same operation mode cannot be connected to each other. For example, in the case of FIG. 6, master legs 510 and 610 are connected to each other. As described above, first, a master leg performs the process of generating a power synchronized with the voltage, frequency, and phase of the other side of the connection. In the case where the other side of the connection is also a master leg, the master legs try to synchronize with the voltage and frequency of the other side. However, the master legs do not autonomously establish the voltage and frequency, so that such a synchronizing process cannot succeed. Therefore, the master legs cannot be connected to each other. There is also another reason. A master leg has to draw a power from the other side of the connection in order to maintain the voltage of the DC bus or has to pass an excessive power to the other side of the connection in order to maintain the voltage of the DC bus. When the master legs are connected to each other, they cannot mutually satisfy requirements of the other sides of connection. If master legs are connected to each other, the voltages of the DC buses cannot be maintained in both of the power routers. There is, consequently, the possibility that an inconvenience such as black-out occurs in each of the power cells. As described above, the roles of the master legs conflict (in other words, do not fit together), the master legs cannot be connected to each other.

Figure 7:
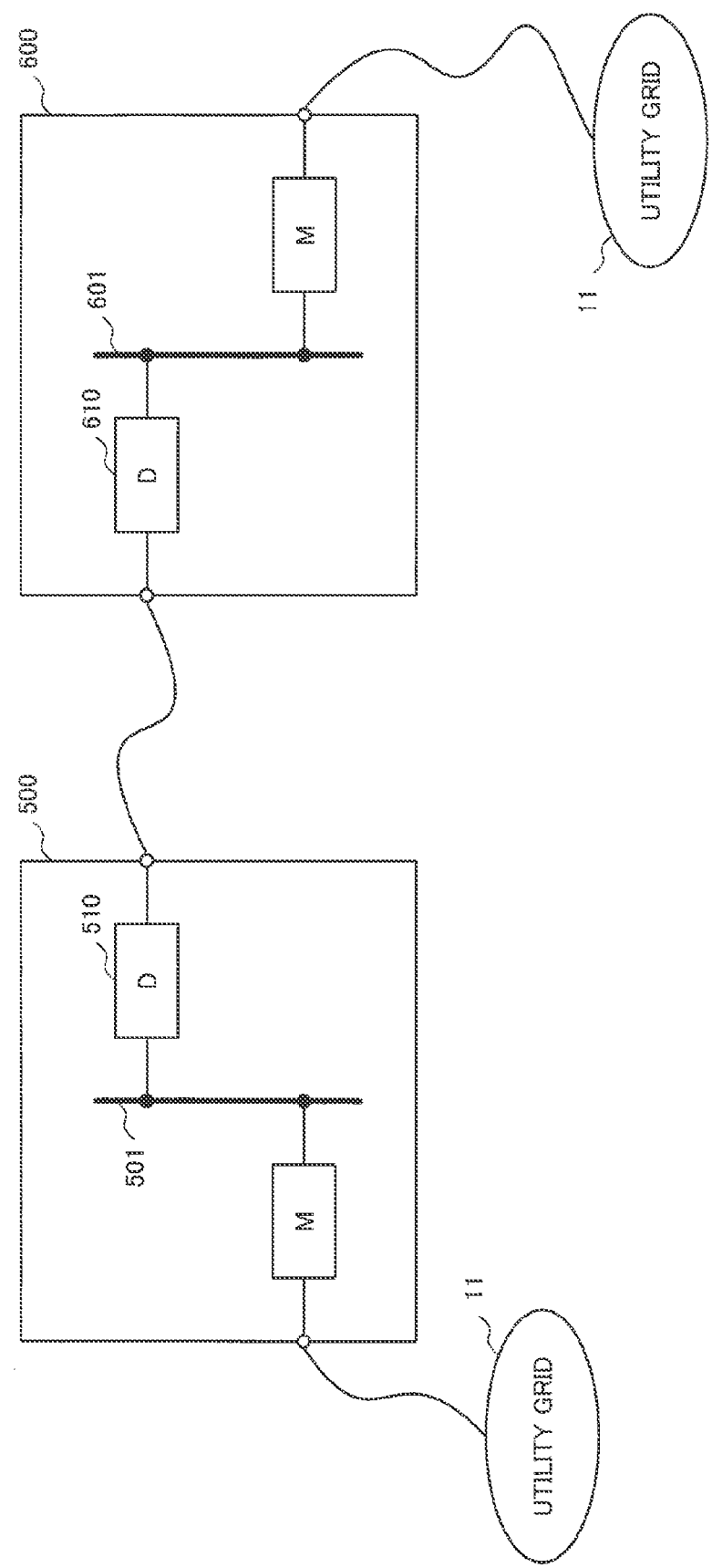
FIG. 7 is a diagram illustrating an example of an inhibited combination in connection of power routers.

FIG. 7 illustrates that designated-power transmission/reception legs are connected to each other, and this is also not successful. Like the above master legs, as described above, first, a designated-power transmission/reception leg also performs a process of generating a power synchronized with the voltage, frequency, and phase of the other side of the connection. In the case where the other side of the connection is also a designated-power transmission/reception leg, the legs try to synchronize with the voltage and frequency of the other side. However, the designated-power transmission/reception legs do not autonomously establish a voltage and frequency, so that such a synchronizing process cannot succeed. Therefore, the designated-power transmission/reception legs cannot be connected to each other. There is also another reason. Even if a designated transmission power to be transmitted from the designated-power transmission/reception leg 510 as one of the legs and a designated reception power to be received by the designated-power transmission/reception leg 610 as the other leg are matched, such the designated-power transmission/reception legs should not be connected to each other. For example, it is assumed that the designated-power transmission/reception leg 510 as one of the legs adjusts the power converter to transmit the designated transmission power. For example, the designated-power transmission/reception leg 510 adjusts so that the output voltage becomes higher than the output voltage of the other side of the connection only by a predetermined value. On the other hand, the other designated-power transmission/reception leg 610 adjusts the power converter to receive the designated reception power. For example, the other designated-power transmission/reception leg 610 adjusts so that the output voltage becomes lower than that of the other side of the connection only by a predetermined value. When such an adjusting operation is performed simultaneously in both of the designated-power transmission/reception legs 510 and 610, both of the legs become out of control.

Figure 8:
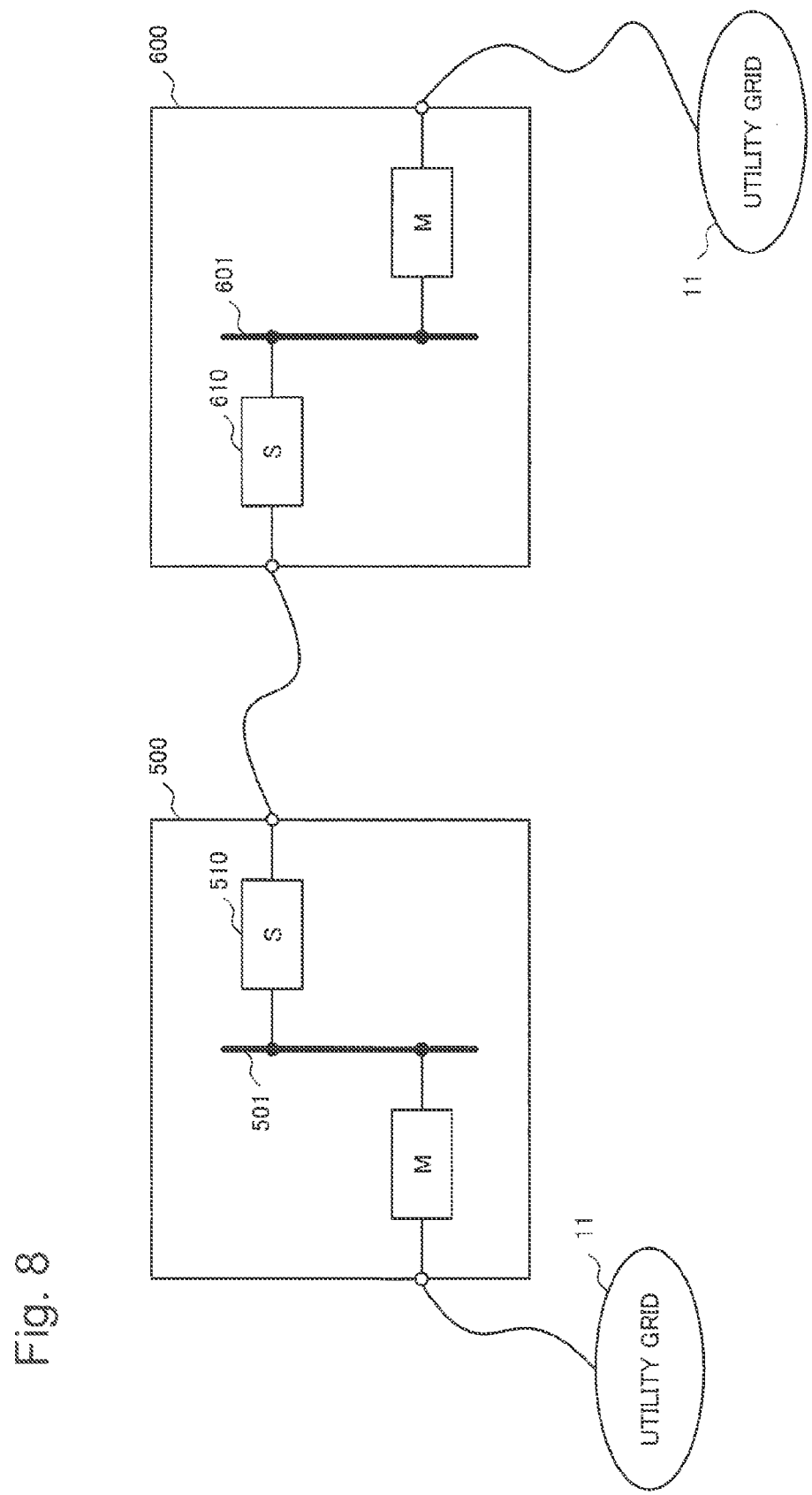
FIG. 8 is a diagram illustrating an example of an inhibited combination in connection of power routers.

FIG. 8 illustrates that stand-alone legs are connected to each other. However, such a connection is not allowed. A stand-alone leg generates a voltage and a frequency by itself. If any of the voltages, frequencies, and phases generated by two stand-alone legs differs even slightly in a state where the stand-alone legs are connected to each other, an unintended power flows between the two stand-alone legs. Since it is difficult to keep a state in which the voltages, frequencies, and phases generated by two stand-alone legs are perfectly matched, it is not allowed to connect stand-alone legs.

Figure 9:
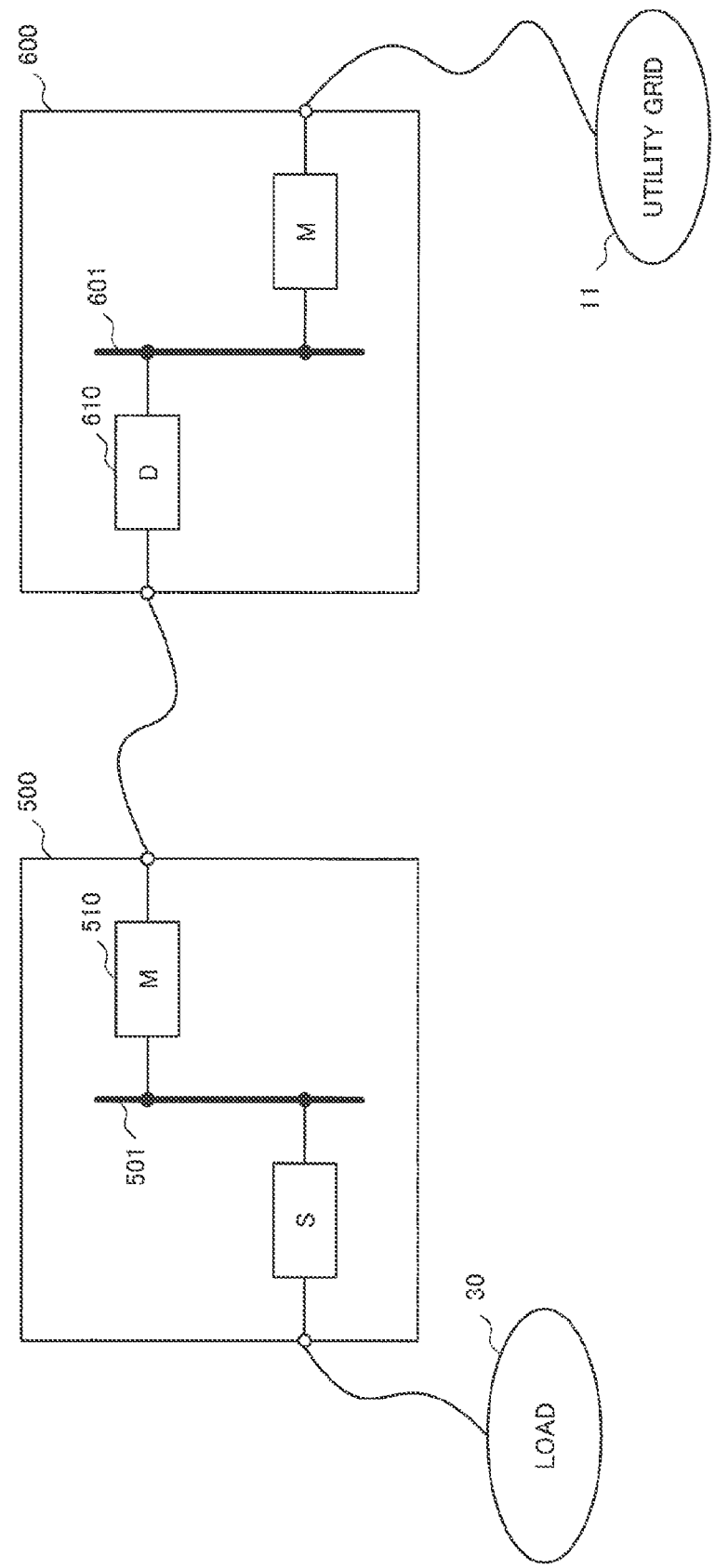
FIG. 9 is a diagram illustrating an example of an inhibited combination in connection of power routers.

FIG. 9 illustrates that a master leg and a designated-power transmission/reception leg are connected to each other. From the above description, this connection also does not work. Even when the master leg 510 tries to transmit/receive power to/from the other side of the connection so as to maintain the voltage of a DC bus 501, the designated-power transmission/reception leg 610 does not transmit/receive power in response to a request of the master leg 510. Therefore, the master leg 510 cannot maintain the voltage of the DC bus 501. Even when the designated-power transmission/reception leg 610 tries to transmit/receive a designated power to/from the other side (510) of connection, the master leg 510 does not transmit/receive the power in response to the request of the designated-power transmission/reception leg 610. Therefore, the designated-power transmission/reception leg 610 cannot transmit/receive the designated power to/from the other side of the connection (in this case, the master leg 510).

Figure 10:
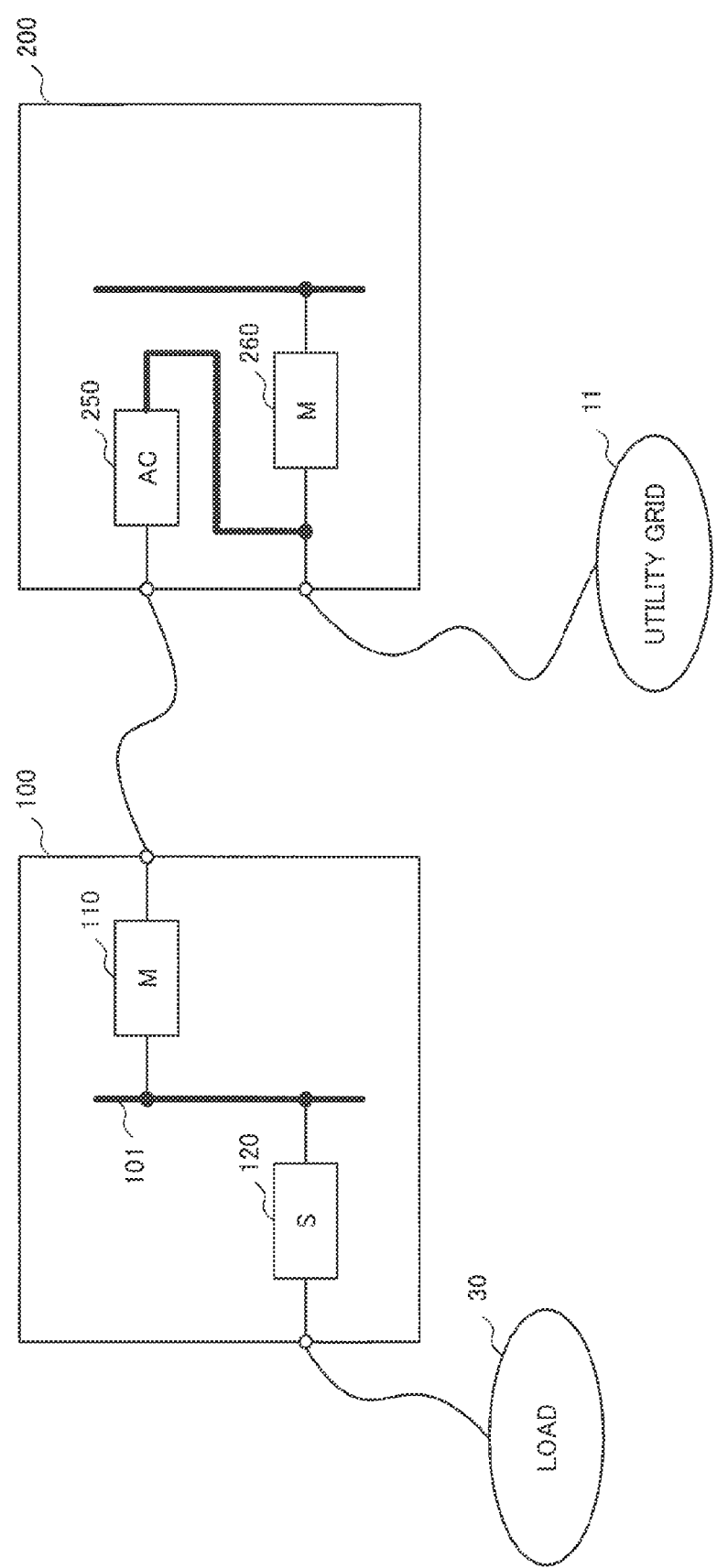
FIG. 10 is a diagram illustrating an example of a possible combination in connection of power routers in consideration of an AC (Alternating Current) through leg.
Figure 11:
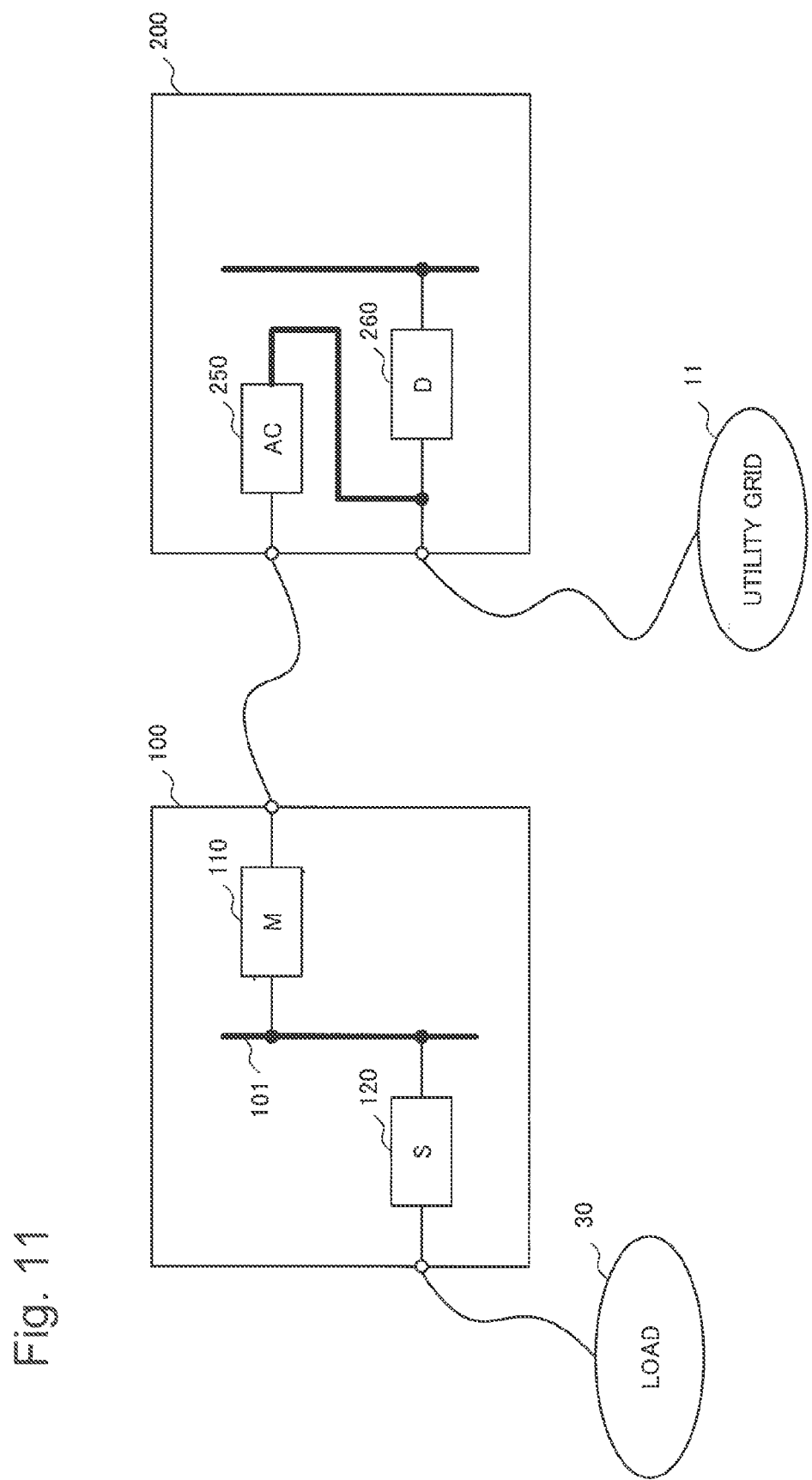
FIG. 11 is a diagram illustrating an example of a possible combination in connection of power routers in consideration of the AC through leg.
Figure 12:
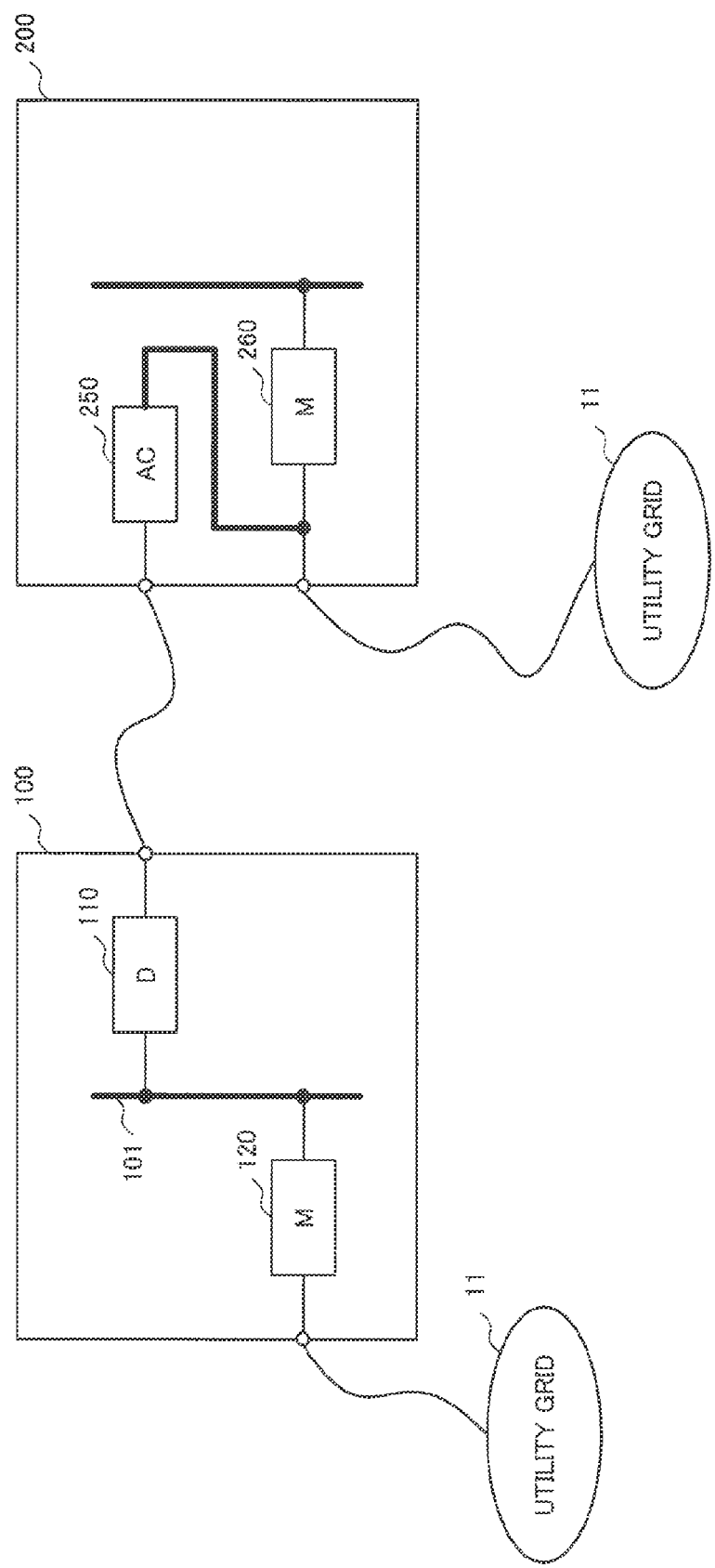
FIG. 12 is a diagram illustrating an example of a possible combination in connection of power routers in consideration of the AC through leg.
Figure 13:
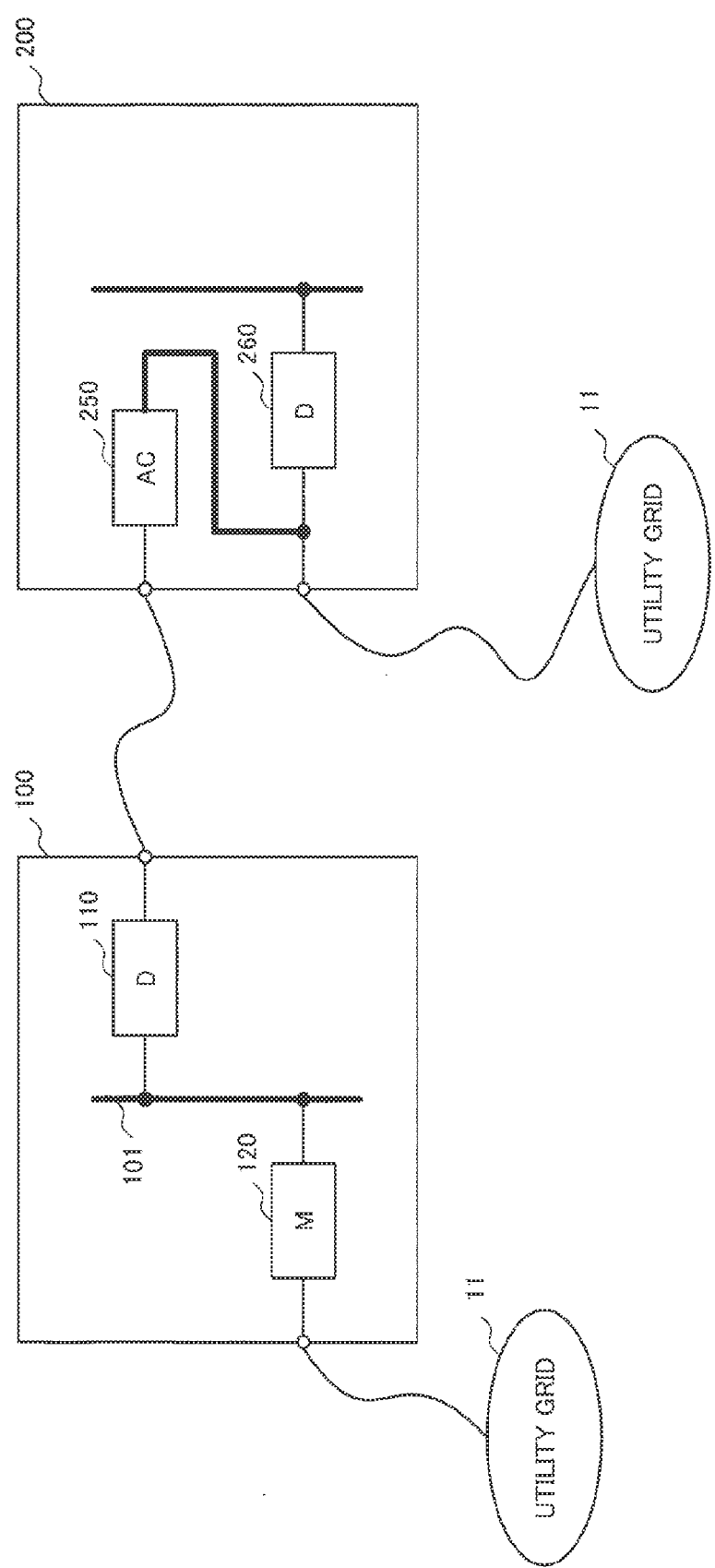
FIG. 13 is a diagram illustrating an example of a possible combination in connection of power routers in consideration of the AC through leg.

Although the cases that legs each having the power converter are connected have been considered, patterns illustrated in FIGS. 10 to 13 are also possible when the AC through leg is taken into consideration. Since the AC through leg does not have a power converter, it is simply a bypass. Therefore, as illustrated in FIGS. 10 and 13, connection of the master leg 110 of the first power router 100 to the utility grid 11 via the AC through leg 250 of the second power router 200 is substantially the same as direct connection of the master leg 110 to the utility grid 11. Similarly, as illustrated in FIGS. 12 and 13, connection of the designated-power transmission/reception leg 110 of the first power router 100 to the utility grid 11 via the AC through leg 250 of the second power router 200 is substantially the same as direct connection of the designated-power transmission/reception leg 110 to the utility grid 11.

Figure 14:
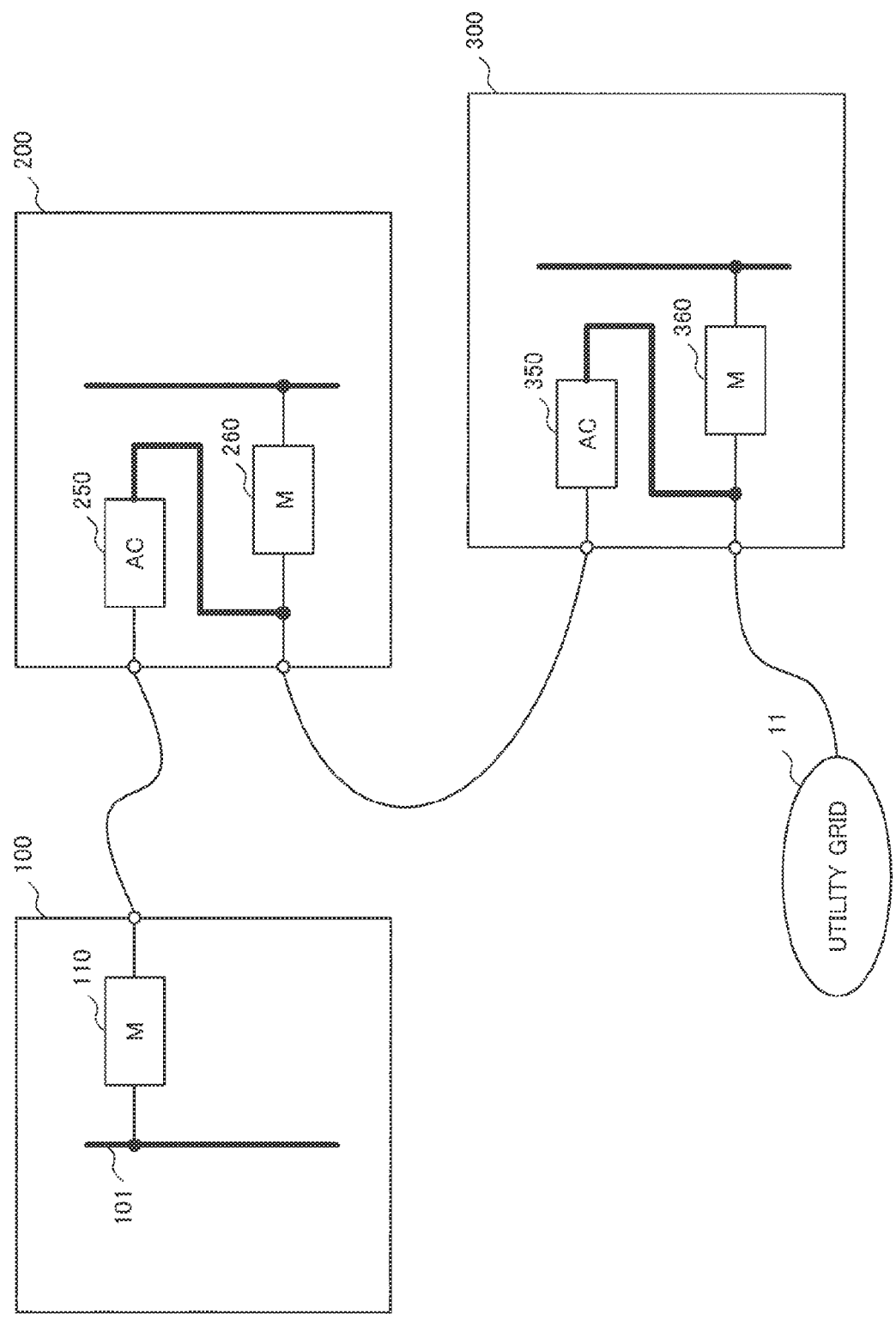
FIG. 14 is a diagram illustrating a connection example using the AC through leg.

Even so, when an AC through leg is provided, there are the following advantages. For example, a case is considered in which, as illustrated in FIG. 14, the distance from the first power router 100 to the utility grid 11 is very long and the first power router 100 has to be connected to the utility grid 11 via some power routers 200 and 300. If there is no AC through leg, as illustrated in FIG. 4, the first power router 100 has to be connected via one or more stand-alone legs. When the first power router 100 is connected via a leg having a power converter, an output is subjected to conversion from an AC power to a DC power and conversion from a DC power to an AC power. In the power conversion, although only a few percent, an energy loss occurs. Therefore, necessity of a plurality of times of power conversion only for connection to the utility grid causes deterioration in efficiency. Therefore, it is advantageous to provide a power router with an AC through leg having no power converter.

Figure 16:
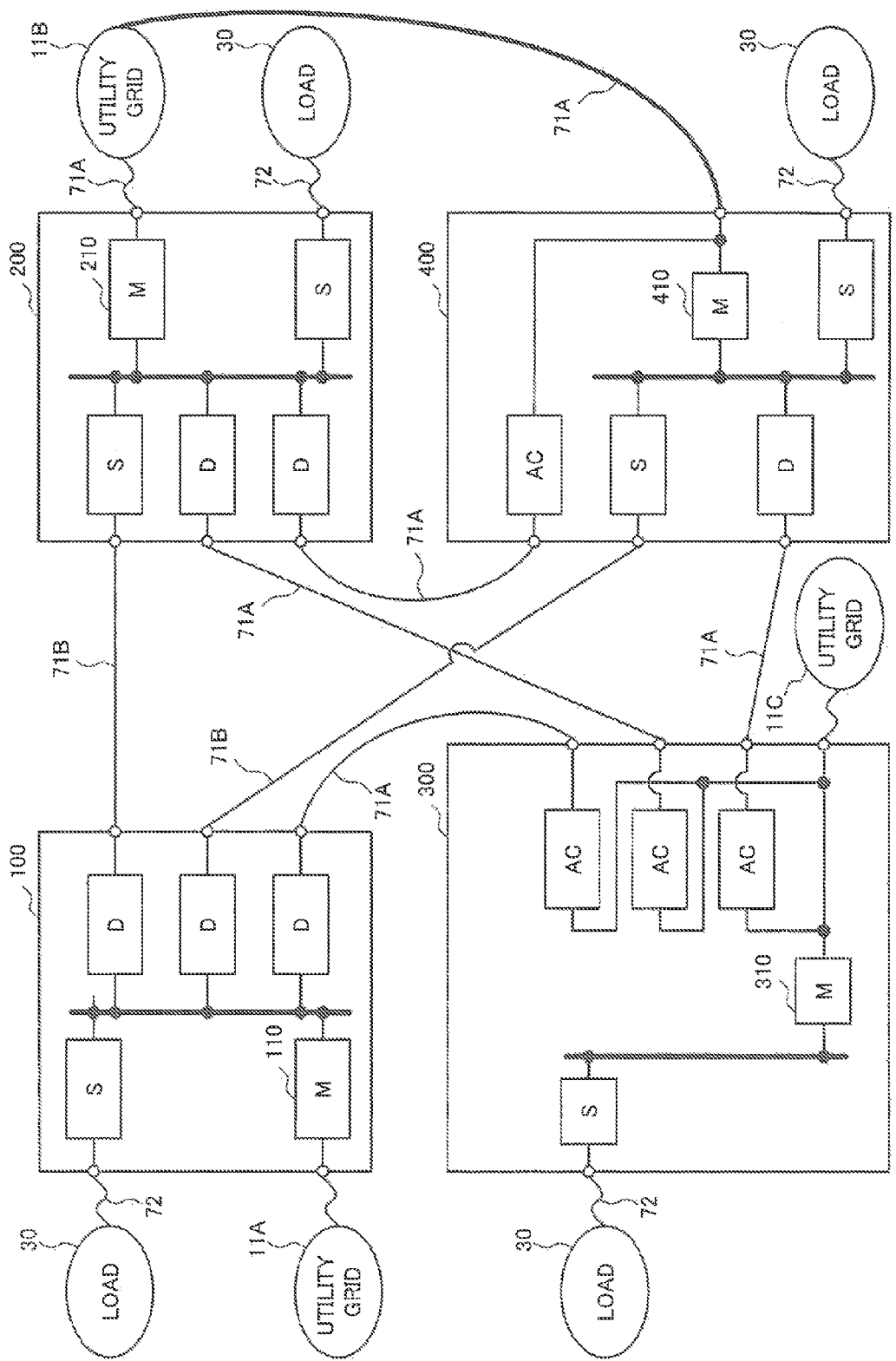
FIG. 16 illustrates an example of mutually connection of the four power routers.

FIG. 15 is a diagram illustrating summary of the above description. FIG. 16 is a diagram illustrating an example of the case of connecting the four power routers 100 to 400 to one another. All of the connection relations illustrated in FIG. 16 are as described above and are allowable connection relations.

A connection line connecting a power router and the other side of the connection will be supplementarily described. A connection line connecting power routers will be called a "transmission line". A transmission line may be a part of the utility grid or may be detached from the utility grid. In FIG. 16, reference numeral "71A" is designated to transmission lines as a part of the utility grid, and reference numeral "71B" is designated to transmission lines detached from the utility grid. Specifically, a plurality of power routers may be connected to the utility grid. When two or more power routers are connected via the utility grid as described above, power interchange via the utility grid among the plurality of power routers becomes possible, and the deficiency and excess of power interchanged can be compensated by the utility grid. On the other hand, two or more power routers may be connected not through the utility grid. When a connection line connecting a power router and a load (or a distributed power supply) is called a "power distribution line 72", the power distribution lines 72 are detached from the utility grid 11. In other words, the power distribution line 72 connecting a power router and a load (or a distributed power supply) is not connected to the utility grid 11.

Figure 17:
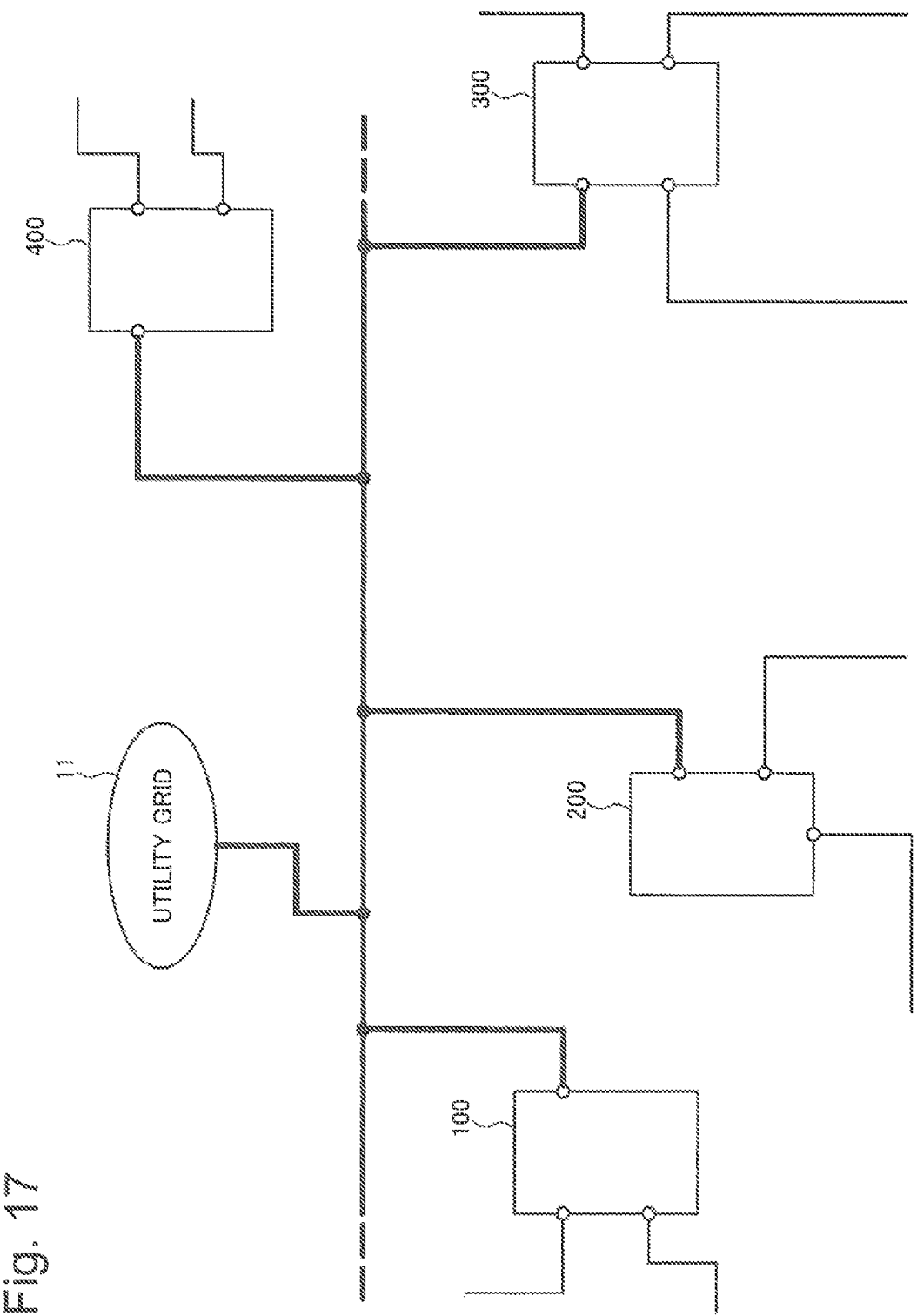
FIG. 17 is a diagram illustrating an example of a mode of connecting a plurality of the power routers by a bus.

As illustrated in FIG. 17, the power routers 100 to 400 may be also connected via a bus. Although the operation modes of the legs will not be described here, obviously, an operation mode of each of the legs has to be selected in consideration of the direction of power interchange and the connection restrictions described above. In FIG. 17, obviously, the utility grid 11 may be replaced to a storage battery or a distributed power supply such as a power generating facility. In other words, a plurality of power routers may be connected to the distributed power supply via a bus.

Figure 18:
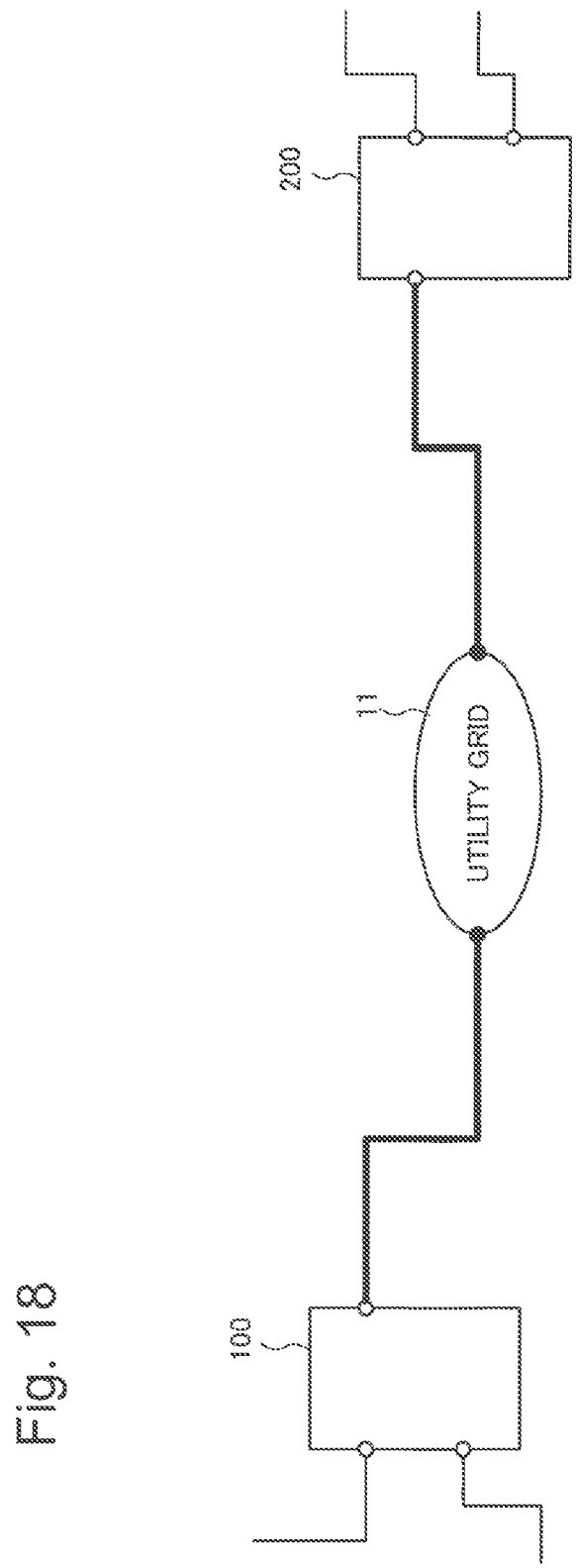
FIG. 18 is a diagram illustrating an example of a connection mode in which a utility grid is interposed between the power routers.

FIG. 18 is a diagram illustrating an example of a connection form that the two power routers 100 and 200 are connected to the utility grid 11. In FIG. 18, the utility grid 11 may be replaced by a distributed power supply.

As described above, the other sides of connection of a power router include the utility grid, a load, a distributed power supply including a storage battery and a power generating facility, and another power router. In the exemplary embodiment, they will be also called a "power system".

A power network system in which power cells are mutually connected asynchronously by power routers can be configured. According to the connection restrictions described in the exemplary embodiment, legs can be connected to each other so that their roles do not conflict. Thus, the power network system can be expanded and the whole can be stably operated.

Figure 28:
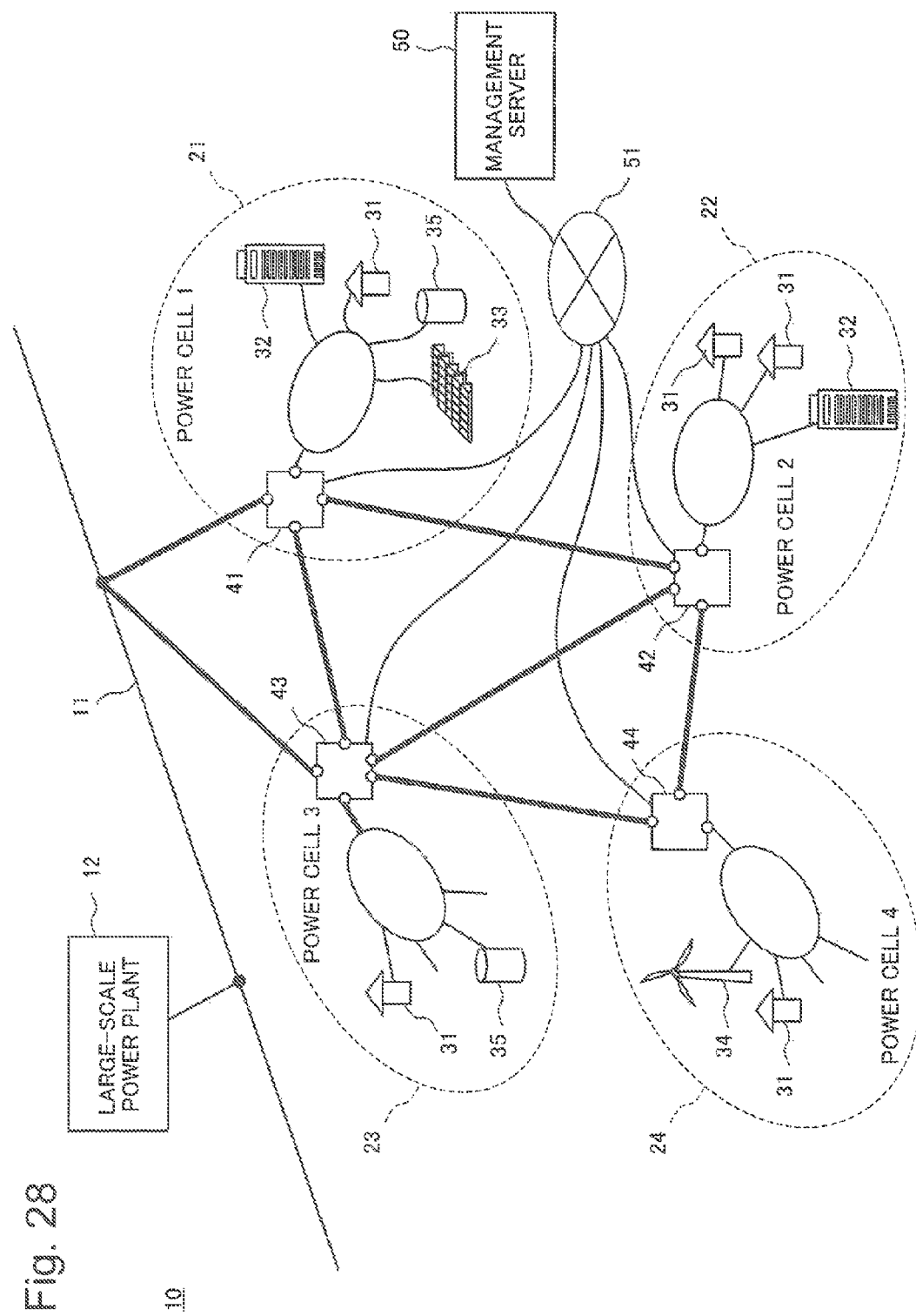
FIG. 28 is a diagram for explaining outline of a power network system.

A problem which may occur in the power network system configured as described above will be explained. As illustrated in FIG. 28, the power routers 41 to 44 perform communication with the management server 50 via the communication network 51. In the case where the communication is interrupted due to a failure or the like, the management server 50 cannot control/monitor one or more of the power routers 41 to 44. When a power router is left without being controlled or monitored, a serious accident may be brought about. Therefore, it is desirable to safely detach the power router which became unable to communicate from the other power routers and power cells. The safe detachment is achieved by stopping legs connected to the other power routers and power cells, for the legs in the power router which became unable to communicate.

However, the management server 50 cannot stop the legs in the power router which became unable to communicate directly via the communication network 51 for a reason that the communication to the power router is interrupted. There is also a method that the power router which became unable to communicate stops its legs by self-determination but the method should not be employed. The reason is that there may be other power routers and power cells depending on power transmitted from the power router which became unable to communicate. When the legs are stopped without considering the dependency relation, chain blackout may be caused.

In the exemplary embodiment, it is considered to safely detach the power router whose communication with the management server 50 is interrupted from the other power routers and power cells. Hereinafter, the detaching operation will be described.

Figure 19:
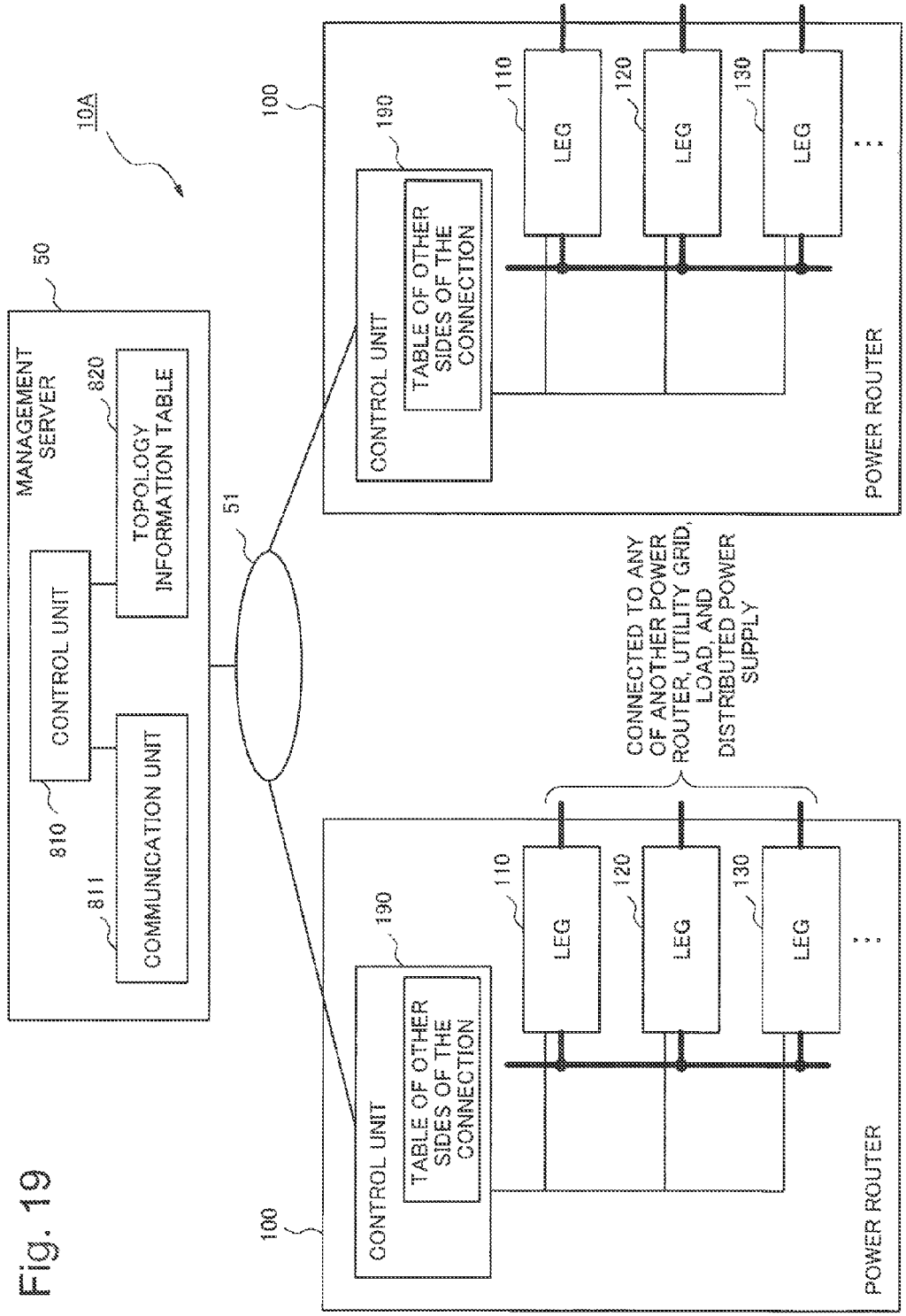
FIG. 19 is a block diagram illustrating a general configuration of the power network system according to the first exemplary embodiment of the present invention.

FIG. 19 is a diagram illustrating a configuration of a power network system 10A according to a first exemplary embodiment of the present invention. As illustrated in FIG. 19, the power network system 10A has the management server 50 and a plurality of power routers 100. The management server 50 communicates with the power routers 100 via the communication network 51 and controls the power routers 100. Each of the plurality of power routers 100 illustrated in FIG. 19 has the same configuration as that of the power router illustrated in FIG. 1.

The management server 50 has a control unit 810, a communication unit 811, and a topology information table 820 (information of the other side of the connection). The control unit 810 controls the operations of the entire management server 50. The communication unit 811 communicates with the power router 100 and the like via the communication network 51. The topology information table 820 is a table in which the other sides of connection are written with respect to legs included in all of the power routers of the power network system 10A.

FIG. 25 is a diagram illustrating an example of the topology information table 820. As illustrated in FIG. 25, the topology information table 820 has records by legs included in all of the power routers of the power network system 10A. Each record includes information indicating "identifier of power router", "number of leg" and "the other side of the connection".

The "identifier of power router" is identification information indicating each of all of the power routers controlled by the management server 50. The "number of leg" is a number indicating each of all of the legs included in the power routers. The "other side of the connection" refers to the kind of the other side connected to the leg. In this case, it is any of the utility grid, power router, load, and distributed power supply.

A record in which the "other side of the connection" is a power router further includes information indicating the "identifier of power router as the other side of the connection" and "number of leg in the other side of the connection". The "identifier of power router as the other side of the connection" is identification information indicating the power router as the other side of the connection of the power router identified by the "identifier of power router". The "number of leg in the other side of the connection" is the number of a leg connected to the leg identified by the "number of leg" in legs of the power router identified by the "identifier of power router as the other side of the connection". By referring to the topology information table 820, the management server 50 can grasp which legs are connected to each other and what is connected to a certain leg.

The topology information table 820 may be generated by a human. Alternatively, the topology information table 820 may be automatically generated by using a neighbor discovery protocol such as LLDP (Link Layer Discovery Protocol).

The control unit 190 included in the power router 100 illustrated in FIG. 19 has a table 821 of the other sides of connection. The table 821 of the other sides of connection is a table in which the other sides of connection are written with respect to the legs in the power router 100. FIG. 27 is a diagram illustrating an example of the table 821 of the other sides of connection. The table 821 of the other sides of connection is a table including a part of the information included in the topology information table 820.

Next, the operations of the power network system 10A according to the first exemplary embodiment of the present invention will be described.

Figure 20:
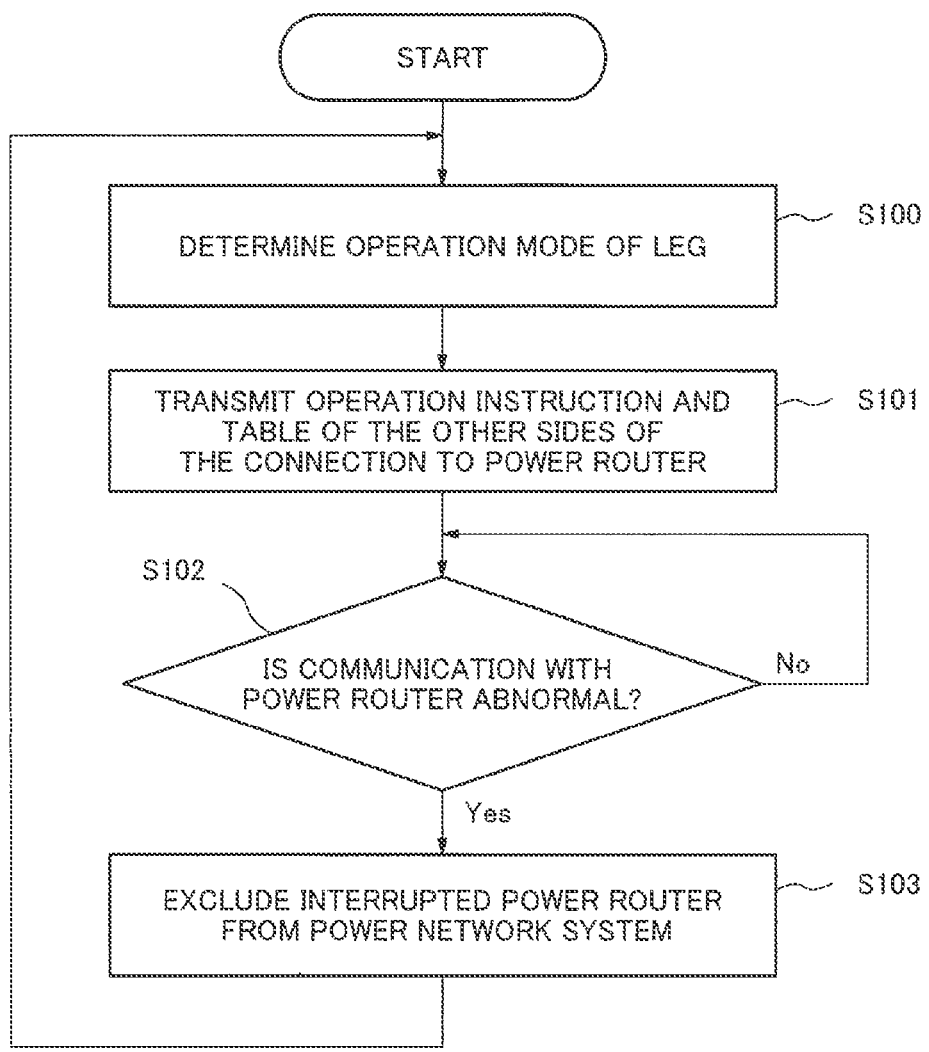
FIG. 20 is a flowchart illustrating operations of a management server according to the first exemplary embodiment of the invention.
Figure 22:
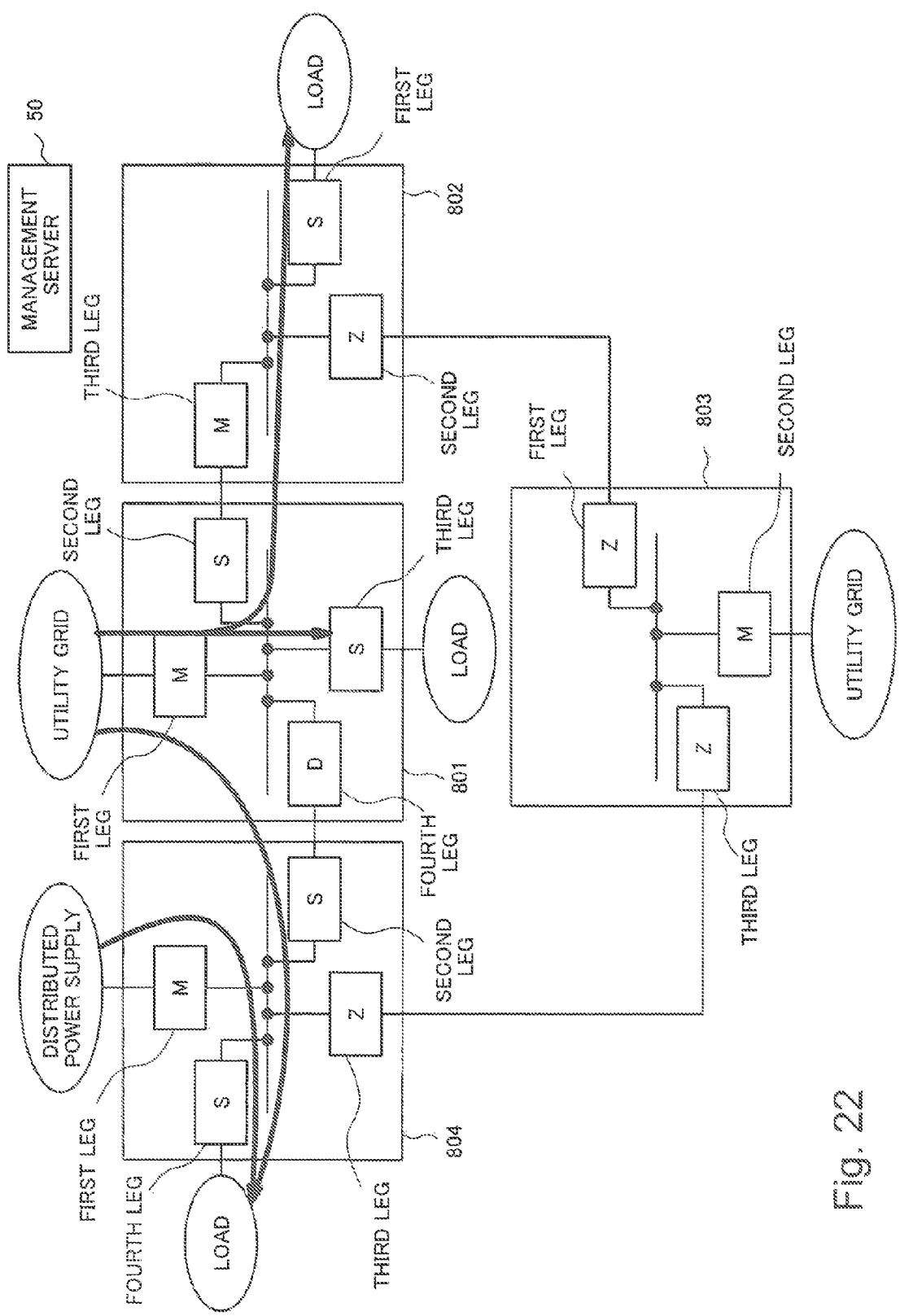
FIG. 22 is a diagram illustrating an example of a state in normal time in the power network system according to the first exemplary embodiment of the invention.

FIG. 20 is a flowchart for describing the operation of the management server 50 according to the first exemplary embodiment of the present invention. FIG. 22 is a diagram illustrating a concrete configuration example of the power network system 10A illustrated in FIG. 19. Referring to FIGS. 20 and 22, the operation of the management server 50 will be described.

First, the management server 50 determines an operation mode of a leg in the control unit 810 (step S100). For example, the control unit 810 can determine operation modes of the legs by using the above-described method disclosed in the WO2014/020951 (hereinbelow, called patent literature 2). The method will be described below.

Patent literature 2 discloses a method of determining power to be transmitted between power cells so that the total cost becomes the minimum on the basis of the difference between the total of supply energy of the power cells and the total of demand energy and cost information. The control unit 810 calculates the magnitude and the direction of power to be transmitted between power cells by using the method disclosed in the patent literature 2. The method disclosed in the patent literature 2 needs information of the transmission capacity of a transmission line between power cells at the time of calculation. The transmission capacity of a transmission line connecting power cells "i" and "j" is expressed by $C(i, j)$ (paragraph 0040 in the patent literature 2). With reference to the topology information table 820, if legs "X" and "Y" are not connected, the control unit 810 preliminarily sets $C(i, j)$ to zero (according to the method described in the patent literature 2, when the transmission capacity of a power line is set to zero, no power flows in the transmission line). "i" indicates the number of a power cell to which the leg "X" belongs, and "j" indicates the number of a power cell to which the leg "Y" belongs. The management server 50 controls so as not to obtain a calculation result which causes, by the setting, a flow of power between legs which are not connected. After that, the control unit 810 determines the operation mode of each of the legs so that a power having the magnitude and direction calculated actually flows. The control unit 810 controls so as to satisfy a restriction of connection between the legs. The control unit 810 sets the operation mode of a leg which transmits/receives no power to "stop".

Subsequently, the control unit 810 transmits an operation instruction and the table of the other sides of connection to the power router 100 via the communication unit 811 (step S101). In other words, the control unit 810 transmits an operation instruction to the power router 100 via the communication network 51 so that the power router 100 operates according to the operation mode of each of the legs determined in step S100. Further, the control unit 810 generates the table 821 of the other sides of connection for each of the power routers 100 on the basis of the topology information table 820 and transmits the table 821 of the other sides of connection to the power router 100 via the communication network 51. For example, the table 821 of the other sides of connection transmitted to the power router 100 whose identifier is "R" is a collection of records that the "identifier of power router" is "R" in the topology information table 820. The table illustrated in FIG. 27 is the table 821 of the other sides of connection for the power router 801 illustrated in FIG. 22, generated on the basis of the topology information table 820 illustrated in FIG. 25.

The control unit 810 determines the presence/absence of an abnormality in the communication with the power router 100 via the communication unit 811 (step S102). When an abnormality is detected (Yes in step S102), the process is advanced to step S103. The following is an example of methods of determining whether a communication is abnormal or not.

Specifically, the management server 50 regularly transmits an echo for alive monitoring to each of the power routers 100. If an echo back cannot be received from a power router 100 within predetermined time, the management server 50 determines that a communication with the power router 100 became abnormal (or the control unit 190 of the power router 100 fails). In the case where communication is performed with the power router 100 by using a reliable communication protocol such as TCP (Transmission Control Protocol), the management server 50 may determine that the communication became abnormal on the basis of occurrence of time-out or disconnection notified from the communication protocol.

Subsequently, the control unit 810 excludes an interrupted power router from the power network system 10A (step S103). In other words, the control unit 810 eliminates a record indicating the connection relation between the power router 100 whose communication becomes abnormal (hereinafter, also called "interrupted power router") and another power router 100 from the topology information table 820. Concretely, when the identifier of the interrupted power router is "R", a record that the "identifier of power router" is "R" and the "other side of the connection" is "power router" and records that the "identifier of power router as the other side of the connection" is "R" are eliminated from the topology information table 820.

After completion of the process in step S103, the control unit 810 re-executes the steps S100 and S101 in order. At this time point, connection between the interrupted power router and another power router 100 does not exist anymore in the topology information table 820. Therefore, as a result of the process in step S100, the control unit 810 sets the operation mode of the leg in the power router 100 (physically) connected to the leg of the interrupted power router to "stop".

The control unit 810 does not transmit an operation instruction and the table 821 of the other sides of connection to the interrupted power router in step S101. The reason why the control unit 810 does not transmit them is because the communication with the interrupted power router is abnormal.

Figure 21:
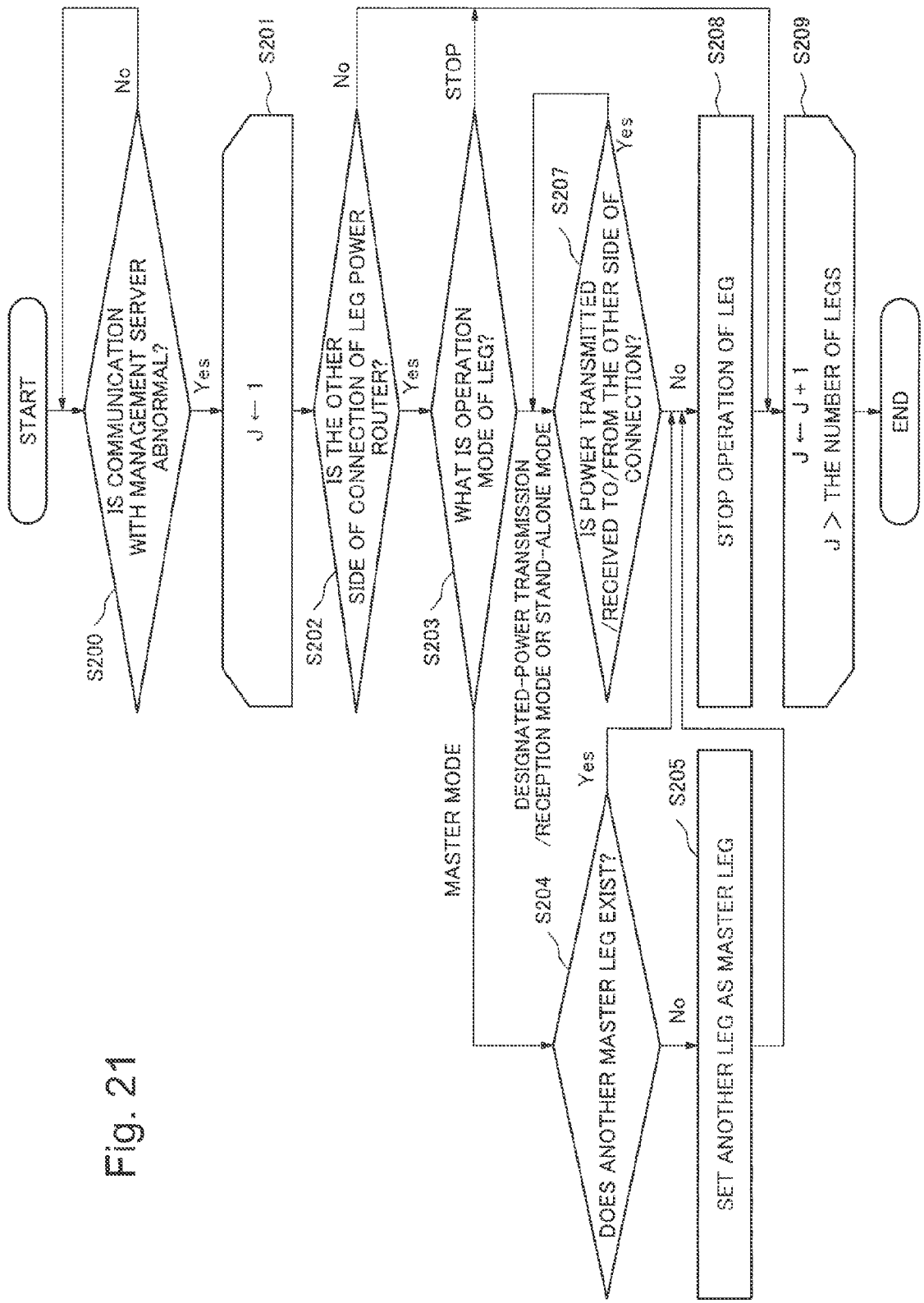
FIG. 21 is a flowchart illustrating operations of a control unit in the power router according to the first exemplary embodiment of the invention.

Next, the operation of the control unit 190 included in the power router 100 will be described. FIG. 21 is a flowchart for explaining the operation of the control unit 190 included in the power router 100. Referring to FIG. 21, the operation of the control unit 190 will be described.

The control unit 190 determines the presence/absence of an abnormality in communication with the management server 50 (step S200). When an abnormality is detected (Yes in step S200), the process is advanced to step S201. Since the method of determining whether communication is abnormal or not is similar to the method in step S102 illustrated in FIG. 20, the description will not be repeated.

The control unit 190 repeatedly executes steps S202 to S209 with respect to each of the legs in the power router 100. A loop counter "J" indicates the number of a leg in the power router 100 and is initialized to "1" in step S201.

The control unit 190 refers to the table 821 of the other sides of connection received from the management server 50 and determines the other side of the connection of a leg is a power router or not (step S202). In other words, the control unit 190 refers to the table 821 of the other sides of connection received from the management server 50, when the other side of the connection of the "J"th leg is "power router", advances the process to step S203 and, when the other side of the connection is not "power router", advances the process to step S209.

The control unit 190 advances the process to step S204 when the operation mode of the "J"th leg is the master mode, advances the process to step S207 when the operation mode is the designated-power transmission/reception mode or the stand-alone mode, and advances the process to step S209 when the operation mode is "stop" (step S203).

In the case where the operation mode of the "J"th leg is the master mode in step S203, the control unit 190 determines whether the leg operating in the master mode exists other than the "J"th leg or not among the legs in the power router 100 (step S204). If there is another leg operating in the master mode, the control unit 190 advances the process to step S208. On the other hand, if such a leg does not exist, the control unit 190 advances the process to step S205.

The control unit 190 sets a leg other than the "J"th leg as a master leg (step S205). Desirably, a leg to be set as a master leg is a leg connected to a stable power system. After step S205, the control unit 190 advances the process to step S208.

The steps S204 and S205 are processes for avoiding a situation that even one master leg does not exist in the power router 100 when the "J"th leg is stopped by the process of step S208.

In the case where the operation mode of the "J"th leg is the designated-power transmission/reception mode or the stand-alone mode in step S203, the control unit 190 determines whether transmission/reception is performed with the other side of the connection (step S207). The control unit 190 waits until the power in the connection terminal 115 of the "J"th leg becomes a predetermined power or less. The control unit 190 calculates the power at the connection terminal 115 on the basis of the measurement values of the current sensor 112 and the voltage sensor 114. When the power at the connection terminal 115 becomes a predetermined power or less, the control unit 190 advances the process to step S208. To prevent erroneous determination caused by instantaneous drop in consumption power or supply power of the other side of the connection of the "J"th leg, the control unit 190 may advance the process to step S208 at the occasion that the state where the power at the connection terminal 115 is equal to or less than a predetermined power continues for a predetermined period.

The control unit 190 stops the operation of the "J"th leg (step S208). After the process of step S208, the control unit 190 advances the process to the step S209.

The control unit 190 increments a loop counter "J" (step S209). Subsequently, when "J" is larger than the number of legs in the power router 100, the control unit 190 breaks the loop. When "J" is equal to or less than the number of legs, the control unit 190 returns to step S202. After break of the loop, the control unit 190 finishes the process.

The operation of the management server 50 and that of the control unit 190 have been separately described above. In practice, the management server 50 and the power router 100 operate in cooperation with each other (as a result). The interrupted power router (in other words, the power router 100 whose communication with the management server 50 became abnormal) is later detached from the power network system 10A and becomes an independent power cell. Hereinafter, the flow of operations performed in cooperation of the management server 50 and the power router 100 will be described using a concrete example.

FIG. 22 is a diagram illustrating the configuration of the power network system 10A according to the exemplary embodiment. FIG. 22 illustrates an initial state where communications between the management server 50 and power routers 801 to 804 are normal. To prevent complication of the drawing, communication lines between the management server 50 and the power routers 801 to 804 are not illustrated in FIG. 22. Legs which are stopped are indicated by "Z". FIG. 25 illustrates the topology information table 820 related to the configuration depicted in FIG. 22.

In the power network system 10A illustrated in FIG. 22, powers described as follows flow in the power network system 10A.

flow of power from the utility grid connected to the first leg in the power router 801 toward a load connected to the third leg in the power router 801 flow of power from the utility grid connected to the first leg in the power router 801 toward the load connected to the first leg in the power router 802 flow of power from the utility grid connected to the first leg in the power router 801 toward the load connected to the fourth leg in the power router 804 flow of power from a distributed power supply connected to the first leg in the power router 804 toward the load connected to the fourth leg in the power router 804

The operation of the management server 50 will be described by using the flowchart illustrated in FIG. 20.

The management server 50 generates the table 821 of the other sides of connection on the basis of the topology information table 820 and transmits it to each of the power routers 801 to 804 (step S101). FIG. 27 illustrates the table 821 of the other sides of connection transmitted by the management server 50 to the power router 801.

It is assumed here that communication between the management server 50 and the power router 801 becomes abnormal. In other words, it is assumed that the power router 801 is an interrupted power router. When the communication becomes abnormal, the determination in step S102 illustrated in FIG. 20 becomes "Yes" and the management server 50 executes step S103.

The management server 50 eliminates records each indicating the connection relation between the interrupted power router and any of the other power routers 802 to 804 from the topology information table 820 (step S103). FIG. 26 is a diagram illustrating the topology information table 820 after the elimination was performed. For easier understanding, in FIG. 26, the eliminated records are indicated by oblique lines.

Figure 23:
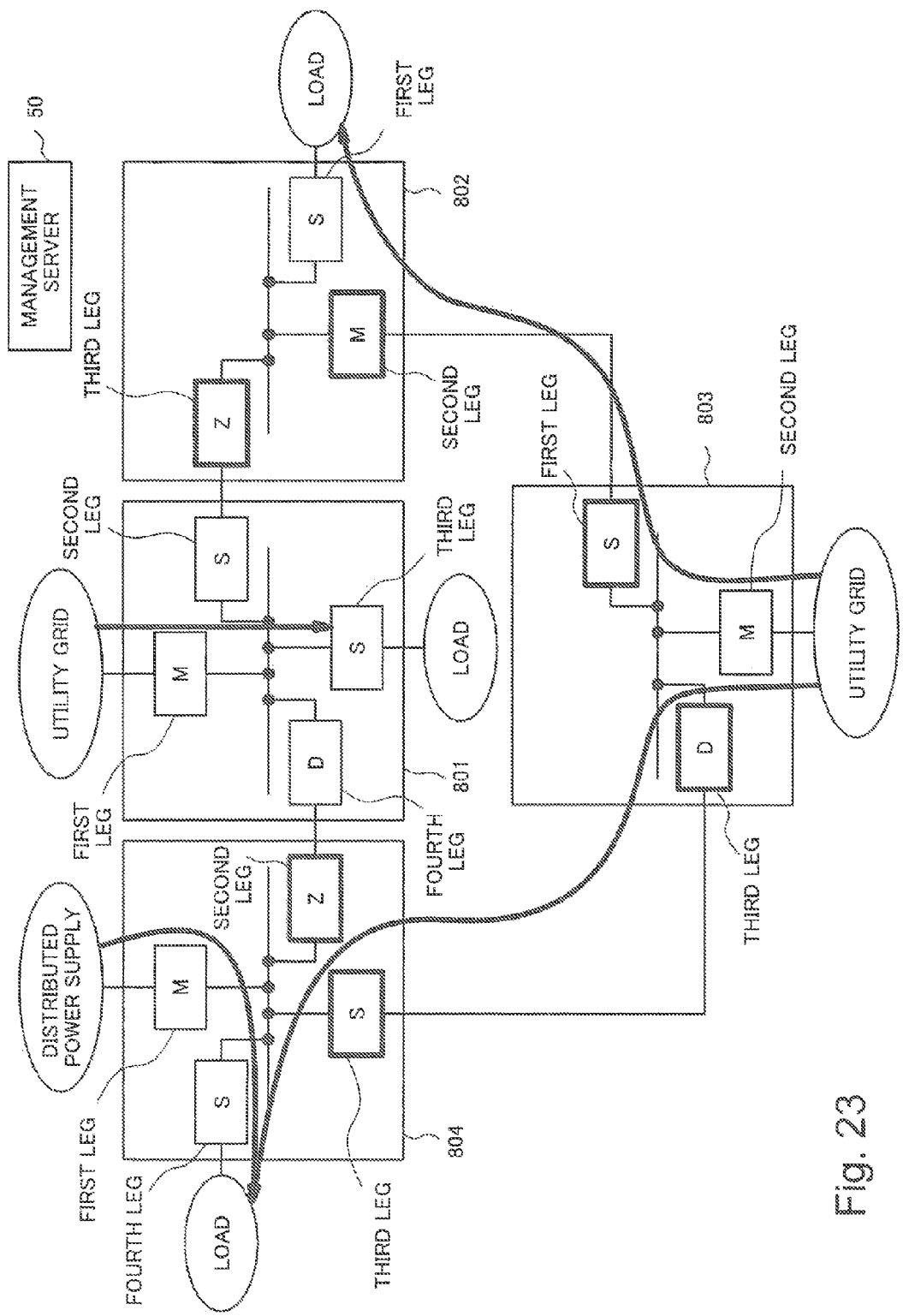
FIG. 23 is a diagram illustrating an example of a state after a process by a management server in the power network system according to the first exemplary embodiment of the invention.

After completion of the process in step S103, the management server 50 re-executes the steps S100 and S101 in order. At this time point, records indicating the connection relations between the interrupted power router and the other power routers 802 to 804 do not exist in the topology information table 820. Consequently, the management server 50 calculates the flow of power which does not pass through the interrupted power router and determines the operation mode for each of the legs. As a result, as illustrated in FIG. 23, the management server 50 sets the operation mode of each of the third leg in the power router 802 and the second leg in the power router 804 connected to the interrupted power router to "stop". The management server 50 also tries to set the operation mode of each of the second and fourth legs of the interrupted power router to "stop". However, the management server 50 cannot transmit an operation instruction to the interrupted power router whose communication is interrupted, so that the management server 50 cannot stop directly the operation of each of the second and fourth legs of the interrupted power router.

FIG. 23 illustrates the flow of power at the completion time of the process in the step S101.

At time point of completion of the process in step S101, the following powers flow in the power network system 10A.

flow of power from the utility grid connected to the first leg in the power router 801 toward the load connected to the third leg in the power router 801 flow of power from the utility grid connected to the second leg in the power router 803 toward the load connected to the first leg in the power router 802 flow of power from the utility grid connected to the second leg in the power router 803 toward the load connected to the fourth leg in the power router 804 flow of power from a distributed power supply connected to the first leg in the power router 804 toward the load connected to the fourth leg in the power router 804

During the operation of the management server 50, the control unit 190 of the interrupted power router operates independently of the management server 50. The operation of the control unit 190 will be described by using the flowchart illustrated in FIG. 21. When the communication with the management server 50 becomes abnormal, the determination in step S200 illustrated in FIG. 21 becomes "Yes", and the control unit 190 executes the steps S201 to S209. In other words, referring to the table 821 of the other sides of connection illustrated in FIG. 27, the control unit 190 determines whether the other side of the connection of the leg is a power router or not. As illustrated in the table 821, the other sides of connection of the second and fourth legs are "power routers", and the other sides of connection of the other legs are not power routers. In other words, legs satisfying the condition of step S202 are the second and fourth legs. The control unit 190 executes the steps S203 to S208 on the second and fourth legs.

First, the second leg will be described. Referring to FIG. 23, the operation mode of the second leg of the interrupted power router is the stand-alone mode. The control unit 190 advances the process to step S207. In step S207, the control unit 190 waits until the power in the connection terminal 115 of the second leg becomes a predetermined power or less. The other side of the connection of the second leg is the third leg in the power router 802. As described above, at this time point, the operation mode of the third leg in the power router 802 is "stop". In other words, since the third leg in the power router 802 does not transmit/receive power, the power at the connection terminal of the second leg of the interrupted power router becomes almost zero. Therefore, the control unit 190 advances the process to step S208. In step S208, the control unit 190 stops the operation of the second leg.

Next, the fourth leg will be described. Referring to FIG. 23, the operation mode of the fourth leg of the interrupted power router is the designated-power transmission/reception mode. The control unit 190 advances the step to step S207. In step S207, the control unit 190 waits until the power at the connection terminal 115 of the fourth leg becomes the predetermined power or less. The other side of the connection of the fourth leg is the second leg in the power router 804. As described above, at this time point, the operation mode of the second leg in the power router 804 is "stop". Therefore, like the second leg, the control unit 190 advances the process to step S208. The control unit 190 stops the operation of the fourth leg in step S208.

Figure 24:
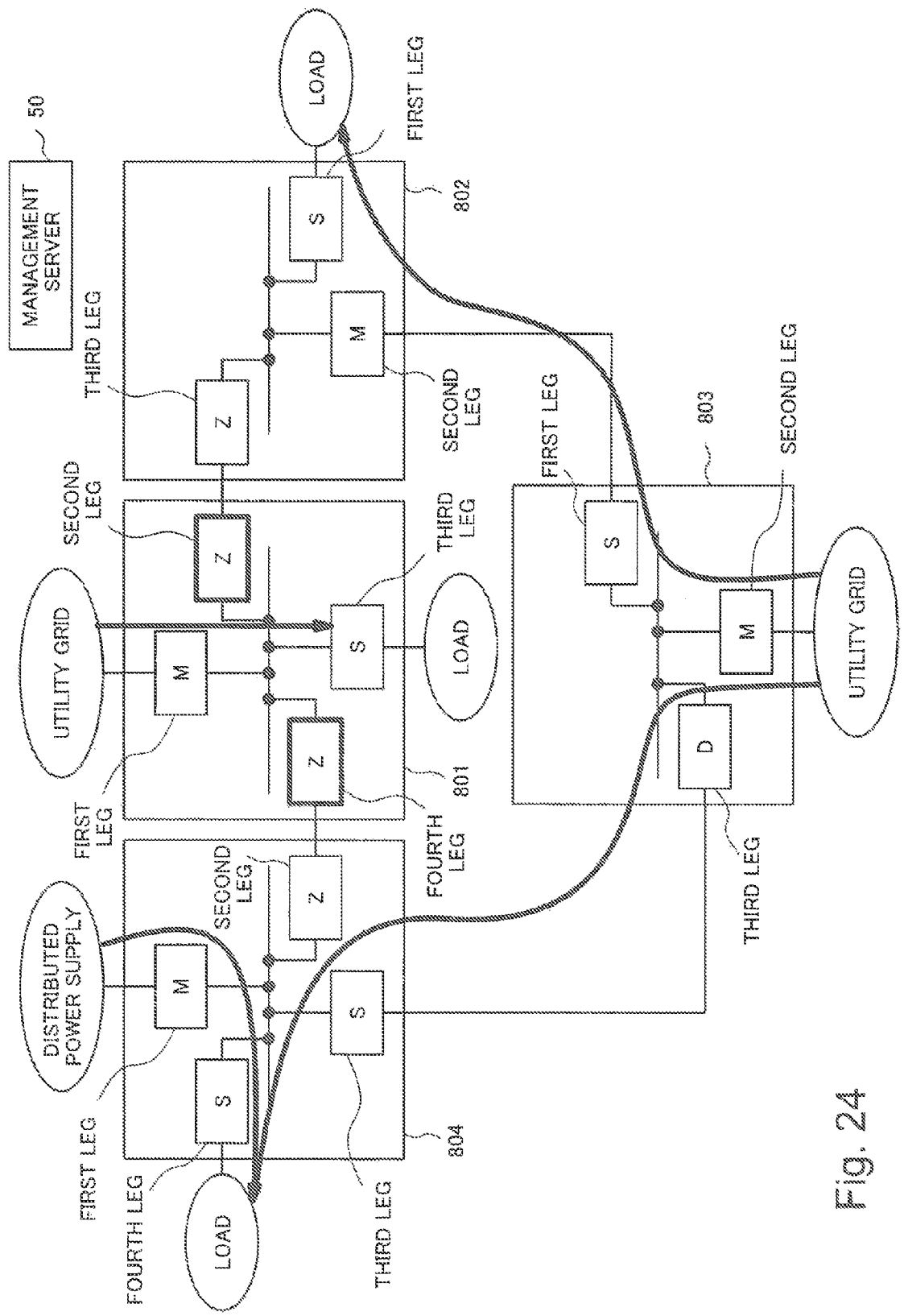
FIG. 24 is a diagram illustrating an example of a state after a process by the control unit in the power router in the power network system according to the first exemplary embodiment of the invention.

FIG. 24 illustrates the flow of power at the time point of completion of the process of the control unit 190.

As illustrated in FIG. 24, as a result of the process of the management server 50 and the control unit 190 of the interrupted power router, the operation of a leg connected to the other power routers 100 in the legs of the interrupted power router is stopped. In other words, the interrupted power router stops transmission/reception to/from the other power routers 100 and the power cells. However, all of the legs of the interrupted power router are not stopped. In the exemplary embodiment, the flow of power from the utility grid connected to the first leg of the interrupted power router toward the load connected to the third leg continues, so that the power of the power cell to which the interrupted power router belongs does not stop.

As described above, according to the exemplary embodiment, the management server 50 controlling the power router 100 has the topology information table 820 in which the other sides of connection are written with respect to the legs included in all of the power routers of the power network system 10A. When the management server 50 detects abnormality in communication with the power router 100, it determines the leg of another power router 100 connected to the power router 100 in which the abnormality is detected on the basis of the topology information table 820. The management server 50 sets the operation mode of the leg to "stop". On the other hand, when the control unit 190 of the power router 100 detects abnormality in communication with the management server 50, it stops the operation of the leg connected to another power router 100.

By employing the above-described configuration, according to the exemplary embodiment, an effect that the power router 100 in which abnormality in communication with the management server 50 is detected can be safely detached from the other power routers and power cells can be obtained.

Second Exemplary Embodiment

Figure 29:
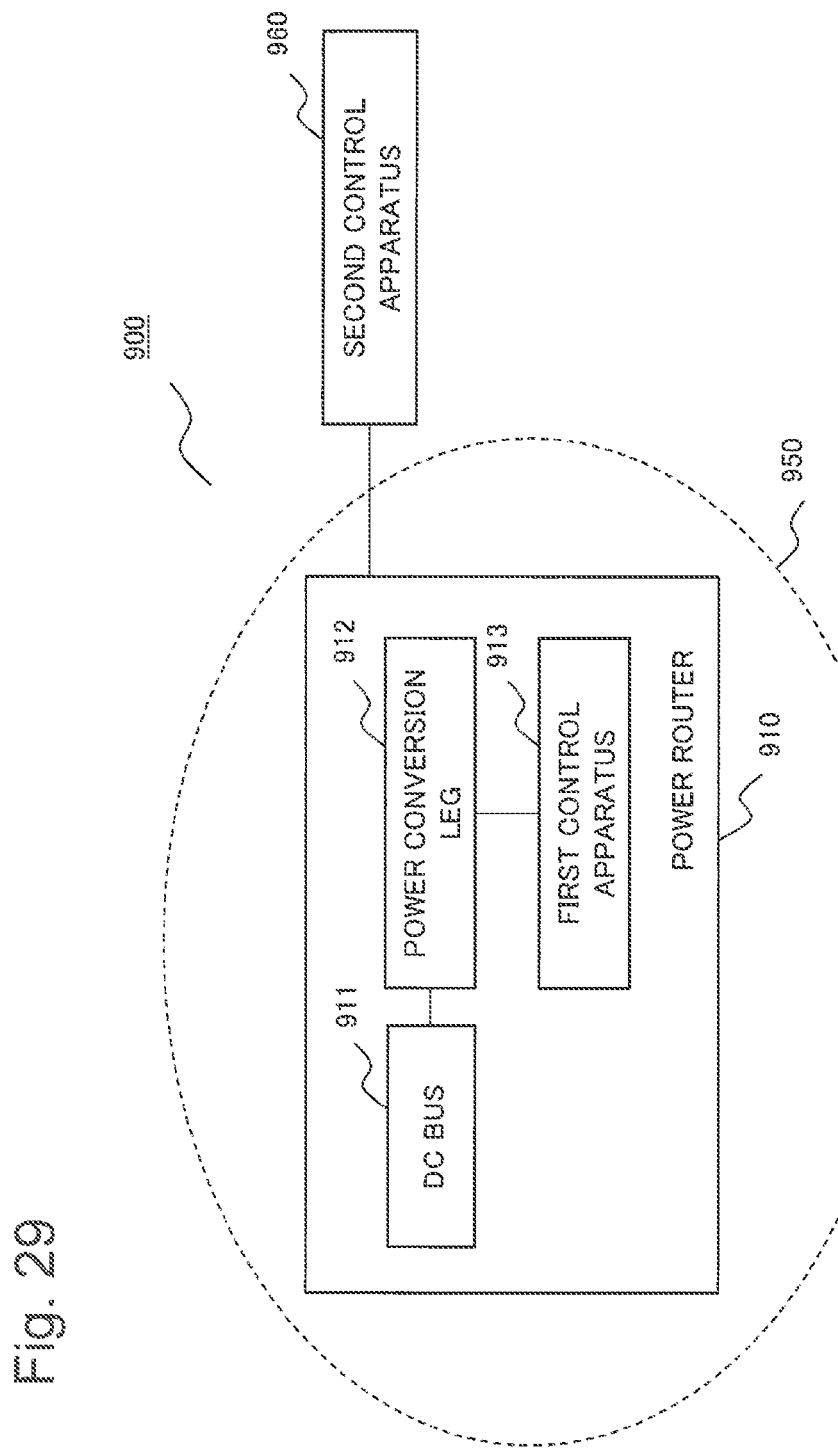
FIG. 29 is a diagram illustrating the configuration of a power network system according to a second exemplary embodiment of the present invention.

FIG. 29 is a diagram illustrating the configuration of a power network system 900 according to a second exemplary embodiment of the present invention. As illustrated in FIG. 29, the power network system 900 has a power cell 950 including a power router 901 asynchronously connected to a power system on the outside.

The power router 901 has a DC bus 911 which is maintained at a predetermined rated voltage, a plurality of power conversion legs 912 each of which one connection end is connected to the DC bus and the other connection end is connected as an external connection terminal to any of an other side of the connection including another power router, a power system, a distributed power supply, and a load, and converting power between the one connection end and the other connection end, and a first control apparatus 913 controlling the plurality of power conversion legs 912.

The power network system 900 further includes a second control apparatus 960 controlling one of or plural of the power cells 950. When the second control apparatus 960 detects abnormality in communication between the apparatus itself and the power router, the second control apparatus 960 controls so as to stop transmission/reception of power between the power router in which the abnormality is detected and another power router which is connected to the power router.

When the first control apparatus 913 included in the power router 910 detects abnormality in communication between the power router 910 and the second control apparatus 960, it controls so as to stop transmission/reception of power of the power conversion leg 912 connected to another power router.

The power conversion leg 912 corresponds to the legs 110 to 160 in the first exemplary embodiment, the first control apparatus 913 corresponds to the control unit 190 in the first exemplary embodiment, and the second control apparatus 960 corresponds to the management server 50 in the first exemplary embodiment.

By employing the above-described configuration, according to the second exemplary embodiment, an effect that the power router 910 in which abnormality in communication with the second control apparatus 960 is detected can be safely detached from the other power routers and power cells, is obtained.

Figure 30:
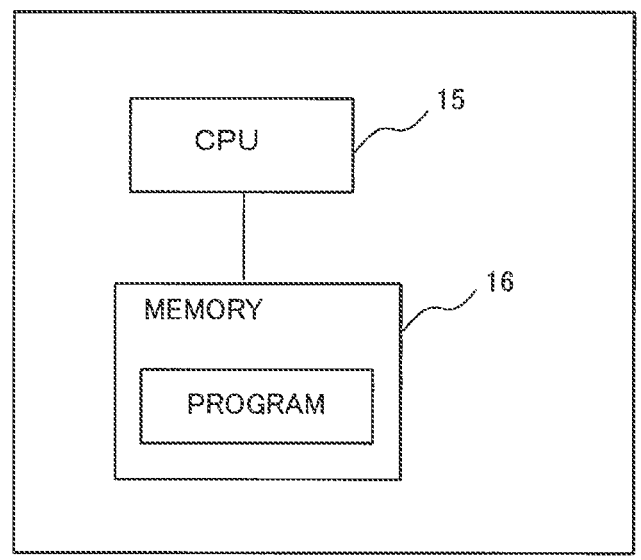
FIG. 30 is a diagram illustrating a hardware configuration of a management server in the exemplary embodiments of the present invention.

The components of the management server illustrated in FIG. 19 are realized by hardware resources illustrated in FIG. 30. In the configuration illustrated in FIG. 30, the control unit 810 and the communication unit 811 in the management server illustrated in FIG. 19 are constructed by a CPU (Central Processing Unit) 15 executing, in a memory 16, a computer program and various data stored in the memory 16. The hardware configuration of an information processing apparatus and function blocks of the apparatus is not limited to the above-descried configuration.

Obviously, the present invention is not limited only to the foregoing exemplary embodiments but can be variously changed without departing from the gist of the present invention already described above. For example, although the present invention is described as the configuration of hardware in the foregoing exemplary embodiment, the invention is not limited to the above. The present invention can be also realized by performing an arbitrary process by making the CPU execute the computer program.

In the above-described example, a program is stored by using a non-transitory computer readable medium of various types and can be supplied to a computer. Non-transitory computer readable media include substantive recording media (tangible storage media) of various types. Examples of the non-transitory computer readable media include magnetic recording media (for example, a flexible disk, a magnetic tape, and a hard disk drive), a magnetic optical recording medium (for example, a magnetic optical disk), a CD-ROM (Read Only Memory), a CD-R, a CD-R/W, a DVD (Digital Versatile Disc), a BD (Blu-ray (registered trademark) Disc), and semiconductor memories (for example, a mask ROM, a PROM (Programmable ROM), an EPROM (Erasable PROM), a flash ROM, and a RAM (Random Access Memory)). A program may be supplied to a computer by any of transitory computer readable media of various types. Examples of the transitory computer readable media include an electric signal, a light signal, and an electromagnetic wave. With the transitory computer readable medium, a program can be supplied to a computer via a wired communication path such as an electric line or an optical fiber or a wireless communication path.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents. Further, it is noted that the inventor's intent is to retain all equivalents of the claimed invention even if the claims are amended during prosecution.

The invention claimed is:

1. A power network system comprising a power cell including a power router asynchronously connected to a power system on the outside,
the power router comprises:
a Direct Current (DC) bus which is maintained at a predetermined rated voltage;
a plurality of power conversion legs each of which one connection end is connected to the DC bus and the other connection end is connected as an outside connection terminal to any of an other side of the connection including another power router, a power system, a distributed power supply, and a load, and converting power between the one connection end and the other connection end; and
a first control apparatus controlling the plurality of power conversion legs, wherein the power network system further comprises a second control apparatus controlling plural of power cells, when the second control apparatus detects abnormality in communication between the apparatus itself and the power router, the second control apparatus performs control so as to stop transmission/reception between the power router in which the abnormality is detected and another power router which is connected to the power router, and when the first control apparatus included in the power router detects abnormality in communication between the power router and the second control apparatus, the first control apparatus performs control so as to stop transmission/reception of the power conversion leg connected to the another power router.

2. The power network system according to claim 1, wherein the second control apparatus has information of the other side of the connection in which the other side of the connection of the power conversion legs in the power router included in the power cell to be controlled are written, specifies the power conversion leg in the another power router, which is connected to the power router in which the abnormality in the communication is detected on the basis of the information of the other side of the connection, and eliminates the information of the other side of the connection related to the specified power conversion leg.

3. The power network system according to claim 1, wherein when the first control apparatus of the power router detects abnormality in communication between the power router and the second control apparatus, the first control apparatus determines whether or not a power transmitted or received by the power conversion leg to/from the another power router is equal to or less than predetermined power, where the power conversion leg is one of the power conversion legs in the power router and the power conversion leg is transmitting or receiving the power of magnitude designated by the second control apparatus to/from the other side of the connection which is the another power router and, when the power is equal to or less than the predetermined power, performs control so as to stop the power conversion leg.

4. The power network system according to claim 1, wherein when the first control apparatus of the power router detects abnormality in communication between the power router and the second control apparatus, the first control apparatus determines whether or not a power transmitted or received by the power conversion leg to/from the another power router is equal to or less than predetermined power, where the power conversion leg is one of the power conversion legs in the power router and the power conversion leg is generating a voltage having an amplitude and a frequency designated by the second control apparatus and is transmitting or receiving the power to/from the other side of the connection which is the another power router and, when the power is equal to or less than the predetermined power, performs control so as to stop the power conversion leg.

5. The power network system according to claim 1, wherein when the first control apparatus of the power router detects abnormality in communication between the power router and the second control apparatus, the first control apparatus controls the power conversion leg so as to transmit or receive power in the master mode, where the power conversion leg is one of the power conversion legs in the power router and is other than the power conversion leg transmitting or receiving power in a master mode for maintaining the DC bus at the predetermined rated voltage and the other side of the connection of which is the another power router, and stops the power conversion leg of which the other side of the connection is the another power router.

6. The power network system according to claim 1, wherein the first control apparatus of the power router obtains information of the other side of the connection in which the other side of the connection of the power conversion legs in the power router included in a power cell controlled by the second control apparatus are written and, on the basis of the information of the other side of the connection, determines whether the other side of the connection of the power conversion leg in the power router is the another power router or not.

7. A power control method in a power network system comprising a power cell including a power router asynchronously connected to a power system on the outside, the power router comprises:

a DC bus which is maintained at a predetermined rated voltage;

a plurality of power conversion legs each of which one connection end is connected to the DC bus and the other connection end is connected as an outside connection terminal to any of the other side of the connection including another power router, a power system, a distributed power supply, and a load, and converting power between the one connection end and the other connection end; and a first control apparatus controlling the plurality of power conversion legs, wherein the power network system further comprises a second control apparatus controlling plural of power cells, when the second control apparatus detects abnormality in communication between the apparatus itself and the power router, the second control apparatus performs control so as to stop transmission/reception between the power router in which the abnormality is detected and another power router which is connected to the power router, and when the first control apparatus included in the power router detects abnormality in communication between the power router and the second control apparatus, the first control apparatus performs control so as to stop transmission/reception of the power conversion leg connected to the another power router.

8. A power router for asynchronously connecting a power cell to a power system on the outside, comprising:

a DC bus which is maintained at a predetermined rated voltage;

a plurality of power conversion legs each of which one connection end is connected to the DC bus and the other connection end is connected as an outside connection terminal to any of the other side of the connection including another power router, a power system, a distributed power supply, and a load, and converting power between the one connection end and the other connection end; and a first control apparatus controlling the plurality of power conversion legs, wherein when abnormality in communication with a second control apparatus controlling plural of power cells is detected, the power router performs control so as to stop transmission/reception of the power conversion leg which is connected to the another power router.

9. A control apparatus controlling plural of power cells each having a power router comprising: a DC bus which is maintained at a predetermined rated voltage; a plurality of power conversion legs each of which one connection end is connected to the DC bus and the other connection end is connected as an outside connection terminal to any of the other side of the connection including another power router, a power system, a distributed power supply, and a load, and converting power between the one connection end and the other connection end; and a first control apparatus controlling the plurality of power conversion legs, wherein when the control apparatus detects abnormality in communication between the apparatus itself and the power router, the control apparatus performs control so as to stop transmission/reception between the power router in which the abnormality is detected and another power router which is connected to the power router.

10. A non-transitory computer-readable storage medium storing a control program causing a power router comprising: a DC bus which is maintained at a predetermined rated voltage; a plurality of power conversion legs each of which one connection end is connected to the DC bus and the other connection end is connected as an outside connection terminal to any of the other side of the connection including another power router, a power system, a distributed power supply, and a load, and converting power between the one connection end and the other connection end; and a first control apparatus controlling the plurality of power conversion legs, and asynchronously connecting a power cell to a power system on the outside, to execute a process, when abnormality in communication with a second control apparatus controlling plural of power cells is detected, of performing control so as to stop transmission/reception of the power conversion leg which is connected to the another power router.

* * * * *